Aug. 11, 1970 W. W. GRAY 3,523,389

LEVER-TYPE WINDOW OPERATOR

Filed Oct. 25, 1968 20 Sheets-Sheet 1

WILLIAM W. GRAY
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 2

William W. Gray
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 3

William W. Gray
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 4

WILLIAM W. GRAY
INVENTOR

BY Jacob L. Davidson
ATTORNEY

LEVER-TYPE WINDOW OPERATOR

WILLIAM W. GRAY
INVENTOR

BY Joseph F. Davidson
ATTORNEY

Aug. 11, 1970 W. W. GRAY 3,523,389

LEVER-TYPE WINDOW OPERATOR

Filed Oct. 25, 1968 20 Sheets-Sheet 6

William W. Gray
INVENTOR

BY Jacob Davidson
ATTORNEY

WILLIAM W. GRAY
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 8

WILLIAM W. GRAY
INVENTOR

BY Jacobi & Davidson
ATTORNEY

LEVER-TYPE WINDOW OPERATOR

Filed Oct. 25, 1968 20 Sheets-Sheet 9

William W. Gray
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 10

William W. Gray
INVENTOR

BY Jacobi & Davidson
ATTORNEY

William W. Gray
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 12

William W. Gray
INVENTOR

BY Jacobi & Davidson
ATTORNEY

William W. Gray
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 14

William W. Gray
INVENTOR

BY Jacobi & Davidson
ATTORNEY

Aug. 11, 1970 W. W. GRAY 3,523,389

LEVER-TYPE WINDOW OPERATOR

Filed Oct. 25, 1968 20 Sheets-Sheet 15

WILLIAM W. GRAY
INVENTOR

BY Jacobi & Davidson
ATTORNEY

William W. Gray
INVENTOR

BY Jacobi & Davidson
ATTORNEY

William W. Gray
INVENTOR

BY Jacobi & Davidson
ATTORNEY

WILLIAM W. GRAY
INVENTOR
BY Jacobi & Davidson
ATTORNEY

William W. Gray
INVENTOR

BY Jacob F. Sanders

ATTORNEY

Aug. 11, 1970 W. W. GRAY 3,523,389

LEVER-TYPE WINDOW OPERATOR

Filed Oct. 25, 1968 20 Sheets-Sheet 20

William W. Gray
INVENTOR

BY Jacob L. Davidson
ATTORNEY

United States Patent Office 3,523,389

Patented Aug. 11, 1970

3,523,389

LEVER-TYPE WINDOW OPERATOR

William W. Gray, Burlington, Ontario, Canada, assignor to H. & A. Supply Company Limited, Burlington, Ontario, Canada Filed Oct. 25, 1968, Ser. No. 778,375

Claims priority, application Canada, Oct. 26, 1967, 3,511

Int. Cl. E05f *11/00, 11/24, 11/28*

U.S. Cl. 49—324 54 Claims

ABSTRACT OF THE DISCLOSURE

A window operator is provided by this invention and the operator includes a base member and at least one and preferably two arms pivotally mounted on the base member for oscillation about an axis which is perpendicular to the plane of the base member. Operator means are provided to oscillate the arms, including a handle mounted for oscillation about an axis parallel to the plane of the base member, and means for translating the oscillatory motion of the handle into the oscillatory motion of the arm or arms. The operator means preferably includes a lever pin mounted on the arms, the lever pins being urged to follow a circumferential path by means of engagement with slots in a slide. Link means, preferably a plate which is slidable in the plane of the member and which includes slots for engagement with the lever pins, are provided for actuating the operator means. The link means is actuated by a handle which is manually oscillatable about an axis which is perpendicular to the axis of rotation of the arms, preferably by means of an oblate cam which is rotationally mounted on the base member for manual oscillation by means of the manually movable handle member, the oblate cam engaging a pin which is urged to follow a circumferential path, the pin engaging a slot in the slide member.

This invention relates to window operators. More particularly, it relates to fundamental improvements to a window operator which may be used for awning, casement, and hopper-type windows. It also relates to a separable interconnector, and more particularly, to a separable interconnector and mountings for the hereinabove described awning, casement or hopper-type windows which are opened and closed by means of a window operator including at least one arm which is caused to rotate and thus to open a window. The mountings with which an aspect of the present invention are more particularly concerned, are ones which interconnect the ends of the arm or arms with the window sash in such a manner that the connection may be easily separated, as when the window is to be cleaned.

A common type of window operator used in the past for these types of windows consists of two levers which are each formed of two lever members pivotally connected together so that the opening action is a scissors movement with the inner lever members being brought towards one another, so that the outer lever members are forced outwardly, thereby pushing the lower edge of the window sash towards the window-opened position.

One window operator of the above-described general type used in the past included a handle, swingable in a plane perpendicular to the plane of the window, such swinging movement urging the lever arms outwardly to open the window. In yet another window operator of the above-described general type used in the past, the inner and outer sections of the links were pivotally connected, and the inner section was attached to a gear section which, in turn, was oscillated by a lever-operated worm.

All these mechanisms were generally satisfactory in operation. However, the primary scissors-type operator is rather expensive in view of the large number of parts involved. The lever which was swingable in a plane perpendicular to the plane of the window suffered the disadvantage that it projected inwardly into the room and thus tended to be obstructive. It would project in the path of drapes hung near the window and furniture placed near the window. Furthermore, there was the danger of collision with the protruding handle, thereby risking breaking the handle. With the worm-type operator, on the other hand, it was found that the operator was subject to rapid wear and malfunction due to stripping of the gears. This problem could be overcome by making the gears more sophisticated in form, but this tended to make the gear too expensive.

Furthermore, many types of means for interconnecting the ends of such lever arm to the lower edge of the window sash have been proposed and used in the past. In one type, the window sash was provided with a hook secured thereto, the hook having a projecting reach portion and an upstanding hook end. The operator link arm was provided, at its distal end, with a clip bar having a slot therein. The window was thus connected to the window operator link by hooking the hook end through the slot. The window was able to be disconnected by opening the window at least to the partially-open position and then manually tilting the hook relative to the bar. While this connector was operative, it suffered the main disadvantage that the operability depended to some extent upon a high degree of curvature and flexibility of the links. In addition, accidental disengagement was said to be prevented mainly by the shaping and size of the clip bar, the slot and the hook, as well as the size and position of the screw fastener. Such interrelation is, obviously, inefficient and subject to error.

Another type of such interconnector included a plurality of spaced pairs of openings in the guide members forming part of the motion transmitting means associated with the window operator, the openings being adapted to receive fingers secured to the window sash. Release was accomplished by means of positively movable latch members carried on the guide member, which releasably engaged the fingers. While this provided, in general, a positive engagement and release, the environment in which the connector was situated is conducive to inclement weather conditions which may well cause the movable latch members to jam, thereby rendering it impossible or extremely difficult to effect the release.

In another type of such interconnector, the strut of the mounting and guide member was pivotally secured to a bar member which was slidably retained in a window mounting member provided with inturned side flanges which wrapped around the bar member. The bar was provided with a bracket having parallel lugs which received a pivot pin adapted to form a fulcrum for a spring-biased latch lever. One end of the latch was thus spring biased through a slot to prevent sliding movement. Pivoting of the lever was said to disengage the latch and permit sliding movement to release the window. This construction suffered the disadvantage previously referred to, namely the pivotally movable latch may become jammed. In addition, the sliding movement between the guide member and the bar member may be prevented by accumulation of dirt, rust, etc.

An object therefore of one aspect of this invention is the provision of improved structures of a window operator which may be used to open and to close a window by means of a simple lever action operating in the plane of the window.

An object of another aspect of this invention is the provision of improved structures of a window operator which includes automatic means for locking the window in the fully-open or in the fully-closed position.

An object of yet another aspect of this invention is the provision of improved structures of a window operator which includes a night latch means for locking the window in a partially-opened position intermediate the fully-opened position and the fully-closed position, such that the window could not readily be forced open.

An object of yet another aspect of this invention is to provide a separable mounting for windows whereby the window may, in its open or in its partially-open position, but not in its fully-closed position, be disengaged from a link arm controlling the movement of the window, without requiring the aid of special tools.

An object of still another aspect of this invention is the provision of such a connector which is positive in its locking action, yet is virtually foolproof in its operation.

An object of another aspect of this invention is the provision of a novel closure operator including such novel separable mounting.

By one broad aspect of this invention, a window operator is provided comprising: (a) a base member; (b) an arm, pivotally mounted on the base member for oscillation about an axis perpendicular to the plane of the base member; (c) a handle pivotally mounted with respect to the base member; and (d) means associated with the base member, the arm and the handle, for translating the oscillatory motion of the handle into the oscillatory motion of the arm.

By a second aspect of this invention, a window operator is provided which comprises: (a) a base member; (b) an arm pivotally mounted on the base member for oscillation about an axis perpendicular to the plane of the base member; (c) operator means on the arm adapted to be operated in order to oscillate the arm; (d) link means for actuating the operator means; and (e) a handle manually oscillatable about an axis perpendicular to the axis of rotation of the arm, for operating the link means.

By a specific embodiment of this second aspect of this invention, a window operator is provided which comprises: (a) a base member including (1) a base plate and (2) a frontal portion perpendicular to the base plate; (b) a pair of lever arms, each pivotally mounted on the base plate for oscillation about an axis perpendicular to the plane of the base plate; (c) a lever pin secured to a portion of each of the lever arms; (d) a slide comprising (1) a plate portion parallel to the base member and including (i) a longitudinally extending slot for accommodating each of the lever arm pivot mounts, and (ii) a transversely extending slot adjacent the marginal edges of the plate portion, for accommodating each of the lever pins, and (2) an actuating portion perpendicular to the plate portion and including (iii) a marginal slot extending towards the plate portion; (e) a rotor eccentrically pivotally mounted on the frontal portion of the base member, the rotor including a rotor pin cooperating with the central marginal slot; and (f) a handle secured to and associated with the eccentric rotor, for oscillating the eccentric rotor.

By a third aspect of this invention, a window operator is provided which includes: (a) a base member; (b) an arm pivotally mounted directly on the base member for oscillation about an axis perpendicular to the plane of the base member; (c) operator means superposed on the arm adapted to be operated in order to cooperate with means on the arm, thereby to oscillate the arm; (d) link means for cooperating with means on said operator means for actuating the operator means; and (e) a handle connected to said link means and manually oscillatable about an axis perpendicular to the axis of rotation of the arm, for operating the link means.

By a specific embodiment of this third aspect of this invention, a window operator is provided which includes: (A) a base member including (1) a base plate and (2) a frontal portion perpendicular to the base plate; (B) a pair of lever arms, each pivotally mounted directly on the base plate for oscillation about an axis perpendicular to the plane of the base plate; (C) a lever pin secured to a portion of each of the lever arms; (D) operator means comprising a slide comprising (1) a plate portion parallel to the base member and superposed over said pair of arms, including (i) a pair of longitudinally extending slots, a selected one being adaptable to accommodate a respective one of the lever arm pivot mounts, and (ii) a pair of transversely extending slots adjacent opposed marginal edges of the plate portion, a selected one being adapted to accommodate a respective one of the lever pins, and (2) an actuating portion perpendicular to the plate portion and including (iii) a marginal slot disposed perpendicular to the plate portion and extending towards the plate portion; (E) a rotor eccentrically pivotally mounted on the frontal portion of the base member, the rotor including a rotor pin engaged in the marginal slot; and (F) a handle secured to the rotor for oscillation about an axis perpendicular to the axis of rotation of the arms, for operating the arms.

By a fourth aspect of this invention, a mounting is provided for separably interconnecting a sash and a window frame, such mounting comprising: (a) a bracket adapted to be secured to said sash, said bracket including an inwardly extending ledge; (b) a longitudinally extending slot in said ledge; (c) a latch bar secured to the inner face of said bracket, said latch bar including an inwardly extending projection movable to overhang said longitudinally extending slot, thereby to provide restricted access to said slot; (d) a tie bar adapted to be securely associated with said window frame, said tie bar including a downwardly projecting finger adapted to project into and to cooperate with said slot; and (e) means for selectively permitting said finger to enter said slot in said latch bar.

By one preferred embodiment of this fourth aspect of this invention, the mounting includes: (b) a pair of longitudinally spaced apart, longitudinally extending slots in said ledge; (c) a latch bar, secured to the inner face of said bracket, said latch bar including a pair of longitudinally spaced apart, inwardly extending projections, each said projection overhanging a selected one of said slots, thereby to provide restricted access to said slots; (d) a tie bar adapted to be securely associated with said window frame, said tie bar including a pair of downwardly projecting, longitudinally spaced apart fingers adapted to register with, project into, and cooperate with, said slots; and (e) a pair of slits, each disposed adjacent a selected associated one of said fingers, and extending inwardly from the forward edge of said tie bar.

By a fifth aspect of this invention, a closure operator is provided for a window having a movable sash and a frame, said operator comprising: (a) a base adapted to be mounted on said frame; (b) a bracket adapted for attachment to a window sash, said bracket including: (i) an inwardly extending ledge, (ii) a longitudinally extending slot in said ledge, and (iii) a latch bar slidably secured to the inner face of said bracket, said latch bar including an inwardly extending projection movable to overhang said longitudinally extending slot, thereby to provide restricted access to said slot; (c) a lever arm pivotally mounted in said base for movement between a retracted position when the window is fully closed to an extended position when the window is fully open; (d) a tie bar, pivotally secured to the free end of said lever arm, said tie bar including a downwardly projecting finger adapted selectively to project into, and to cooperate with, said slot; and (e) means for selectively permitting entry of said finger into said slot, thereby separably interconnecting said sash to said frame.

By one embodiment of this fifth aspect of the invention, the bracket includes: (ii) a pair of longitudinally spaced apart, longitudinally extending slots in said ledge; and (iii) a latch bar secured to the inner face of said bracket, said latch bar including a pair of longitudinally spaced apart, inwardly extending projections, each said projection overhanging a selected one of said slots, thereby to provide restricted access to said slots; and wherein said tie bar includes a pair of downwardly projecting, longitudinally spaced apart fingers adapted to register with, project into, and cooperate with, said slots.

By a second embodiment of this fifth aspect of this invention, the lever arm includes: (e) a primary lever arm pivotally mounted at one end to said base, the other end of said lever arm being upwardly bent, preferably at an angle of about 30°; and (f) a short link, one end being correspondingly upwardly bent and being pivotally secured to the upwardly bent end of said primary lever arm, the other end of said short link being pivotally secured to said tie bar.

By a sixth aspect of this invention, a closure operator is provided for an awning-type window having a movable sash and a fixed frame, the operator comprising: (I) operating mechanism on said frame; (II) a pair of arms movable by said operating mechanism; and (III) motion-translating mechanism associated with said arms and said sash, said motion-translating mechanism including (a) a bracket adapted for attachment to a window sash, said bracket including (i) an inwardly extending ledge, (ii) a longitudinally extending slot in said ledge, and (iii) a latch bar secured to the inner face of said bracket, said latch bar including an inwardly extending projection overhanging said longitudinally extending slot, thereby to provide restricted access to said slot; (b) a tie bar, adapted to be pivotally secured to a respective free end of each of said pair of arms, said tie bar including a downwardly projecting finger adapted selectively to project into and cooperate with said slot; and (c) means slectively permitting entry of said finger into said slot, thereby separably interconnecting said sash to said frame.

In one embodiment of this sixth aspect of this invention, the bracket includes: (ii) a pair of longitudinally spaced apart, longitudinally extending slots in said ledge; and (iii) a latch bar secured to the inner face of said bracket, said latch bar including a pair of longitudinally spaced apart, inwardly extending projections, each said projection overhanging a selected one of said slots, thereby to provide restricted access to said slots; and wherein said tie bar includes a pair of downwardly projecting, longitudinally spaced apart fingers adapted to register with, project into, and cooperate with, said slots.

In a second embodiment of this sixth aspect of this invention, each lever arm includes: (e) a primary lever arm pivotally mounted at one end to said base, the other end of said lever arm being upwardly bent, preferably at an angle of about 30°; and (f) a short link, one end being correspondingly upwardly bent and being pivotally secured to the upwardly bent end of said primary lever arm, the other end of said short link being pivotally secured to said tie bar.

In the accompanying drawings.

Figure 1:
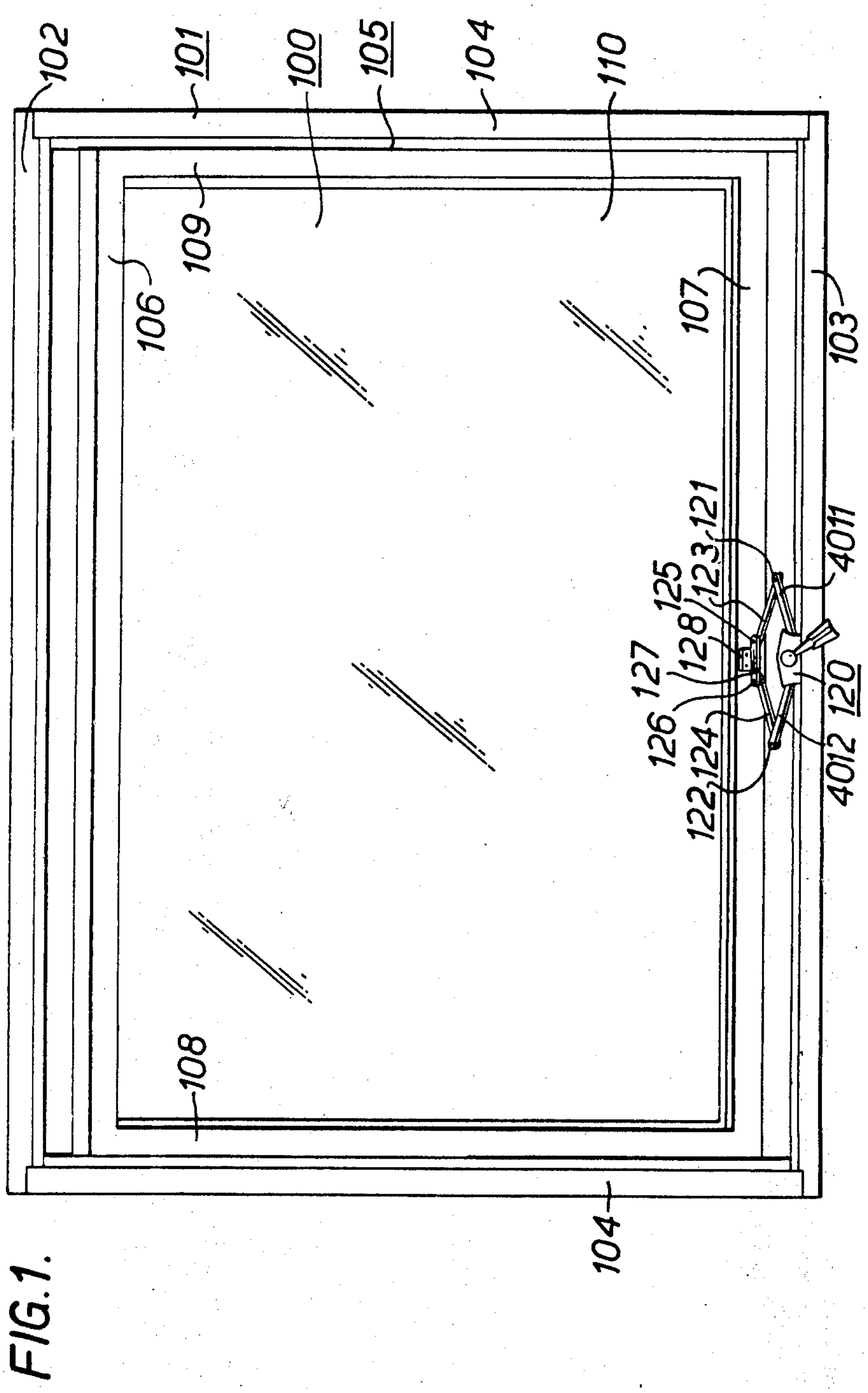
FIG. 1 is an interior elevational view of an open casement window provided with the window operator of an aspect of this invention.
Figure 2:
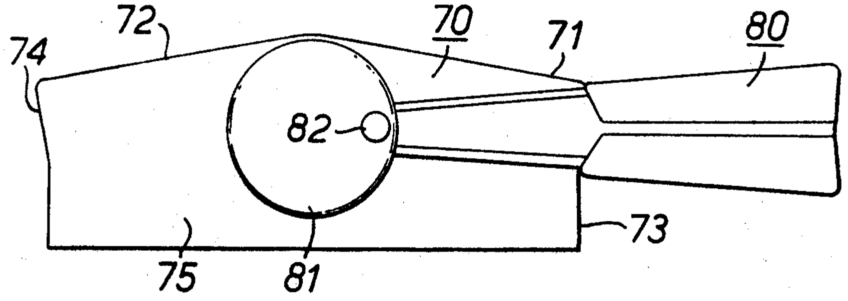
FIG. 2 is a front elevational view of one embodiment of the window operator of one aspect of this invention.
Figure 3:
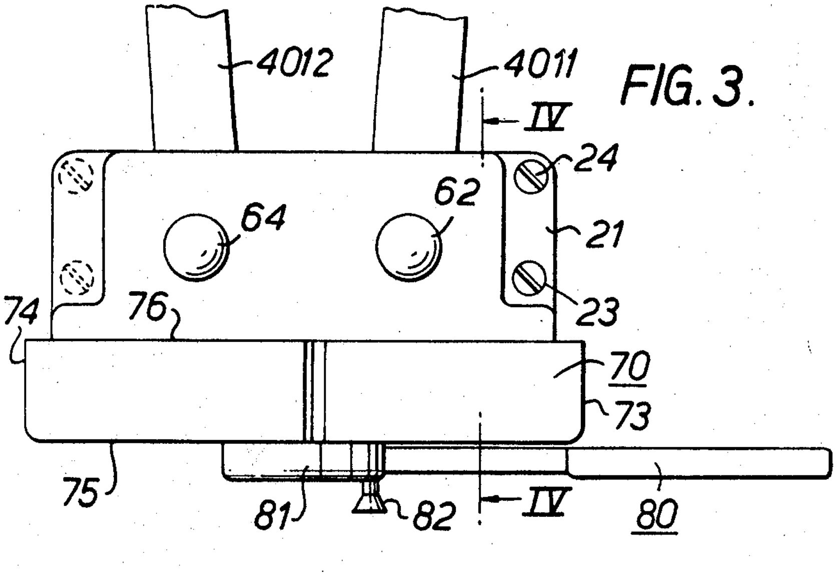
FIG. 3 is a top plan view of the embodiment shown in FIG. 2.

Turning firstly to FIG. 1, a casement-type window, shown generally as 100, includes a frame 101 composed of an upper rail 102, a lower sill 103 and a pair of side jambs 104. A window sash 105 includes upper and lower rails 106, 107, and side rails 108, 109 which are hingedly connected by hinges (not shown) to the upper rail 102. The sash members 106, 107, 108, 109 surround and support a pane of glass 110.

Secured to the lower sill 103 is the window operator 120 of one embodiment of one aspect of this invention. The lever arms 4011, 4012 are secured by pins 121, 122 to secondary lever arms 123, 124. These secondary lever arms are secured by pins 125, 126 to connecting element 127 of bracket 128 which, in turn, is secured to lower rail 107 of sash 105. Connecting element 127 may be detachably secured by means well known in the art, or by detachable securing means to be described hereinafter, to bracket 128, so that the window may be removed for cleaning or other purposes.

The window operator 120 of the embodiment shown in the drawings in FIGS. 1–11 comprises a stacked arrangement of an L-shaped base member 20, an L-shaped slide member 30, lever arms 4011 and 4012, and an L-shaped back member 50. The base member 20, the slide member 30 and the back member 50 are secured together with the first lever arm 4011 and the second lever arm 4012 disposed therebetween by means of an assembly rivet 60 for the first lever arm 4011 and an assembly rivet 61 for the second lever arm 4012. Spacing washers 66, 67, 68 and 69 are disposed, respectively, between back member 50 and first lever arm 4011, between slide member 30 and base member 20, between back member 50 and second lever arm 4012, and between slide member 30 and base member 20. The front portion of the window operator is covered by a cover 70. A handle 80 is mounted for oscillation in a plane perpendicular to the axis of rotation of arms 4011 and 4012 and forms part of the window operator.

The base member 20 includes a base plate 21, provided with a plurality of marginal assembly apertures, in this case four. When the window operator is mounted on a window sill, it is secured to the sill by means of screws 24. The base member 20 also includes a frontal portion 25 which is provided with a centrally-disposed mounting aperture 26 whose co-operation with the remainder of the elements of the window operator will be explained hereinafter.

The slide 30 includes a slide plate 31 disposed in general parallel relationship to the base plate 21. The slide plate 31 includes a first longitudinally extending slot 32 and a second longitudinally extending slot 33. In addition, the slide plate icludes a first transversely extending marginal slot 34 and a second transversely extending slot disposed angularly opposite from the first slot 34.

The slide is also provided with an actuating portion 36 disposed generally perpendicularly to the slide plate 31. The actuating portion is formed with a central marginal transverse slot 37 extending almost to the intersection of the slide plate 31 and the actuating portion 36. In addition, the actuating portion 36 is provided with an aperture 38 in which is secured a glide pin 39.

The first lever arm 4011 includes a laterally extending operator portion 41, and similarly, the second lever arm 4012 includes a laterally extending operator portion 42. The laterally extending portion 41 is provided with a first lever pin 43, which is rotationally mounted in a first bearing 45 which, in turn, is secured in slot 34. A spacing washer 46 is provided between the first lever arm 4011 and the slide plate 31. Similarly, the laterally extending operator portion 42 is provided with a second lever pin 44, which is rotationally mounted in a second bearing 47 which, in turn, is secured in slot 35. A second spacing washer 48 is disposed between second lever arm 4012 and the slide plate 31.

The back 50 includes a back member 51 extending in a plane generally parallel to the plane of base plate 21, slide plate 31 and lever arms 40. The back member is provided with a pair of assembly apertures 52 through which an assembly rivet 60 for the first lever arm 4011 and an assembly rivet 61 for the second lever arm 4012 is adapted to pass. Assembly rivet 60 is rotationally mounted in a first bearing 55, while assembly rivet 61 is mounted in a second bearing 56. As seen more clearly in FIGS. 3 and 10, assembly rivet 60 includes a head 62 and a tail 63 which secures the rivet together. Disposed between back member 51 and arm 4011 is a spacing washer 66 and disposed between the lever arm 4011 and the slide plate 31 is another spacing washer 67. Similarly, the assembly rivet 61 includes a head portion 64 and a tail portion 65 securing the rivet together. Disposed between back member 51 and second lever arm 4012 is a spacing washer 68, and disposed between second lever arm 4012 and slide plate 31 is another spacing washer 69. The back also includes an upright frontal portion 53, provided with a glide-guiding slot 54, on which a roller 99 mounted on the glide pin 39 is adapted to roll. The frontal portion 53 is also provided with a pair of holes 54 to enable the back 50 to be secured to the base member 20. Thus, a pair of hollow cylindrical spacing cylinders 91 are secured in longitudinally spaced apart apertures 92 in frontal portion 25 of base member 20, and the cylinders extend to the frontal portion 53 of back 50. Securing pins 93 extend through openings 94 and then into cylinders 91.

The cover 70 is provided with a first downwardly sloping roof portion 71 and a second downwardly sloping roof portion 72. It is provided with a first depending wall portion 73 and a second depending wall portion 74. The cover 70 includes a front face 75, provided with a centrally-disposed circular, handle-mounting aperture 77, and a rear face 76.

The window operator is manually actuated by means of a handle 80, which includes a hub portion 81, a mounting portion 78 and a lock pin 82. The handle is pivotally mounted on the frontal portion 25 of the base member 20 by means of rotor bolt 88 which passes through centrally-disposed mounting aperture 26, and extends into a tapped aperture 90 in the hub portion 81.

Disposed behind the frontal portion 25 is an eccentric rotor 83, provided with a rotor pin 84 on which is mounted a structurally rigid roller 79, the pin 84 being in the eccentric portion 97 thereof, and an aperture 87 located at the center of the rotor and through which rotor bolt 88 is adapted to pass. The eccentric rotor 83 is provided with a plurality of mounting holes 86 by which it is secured to the mounting portion 78 of the handle.

Figure 5:
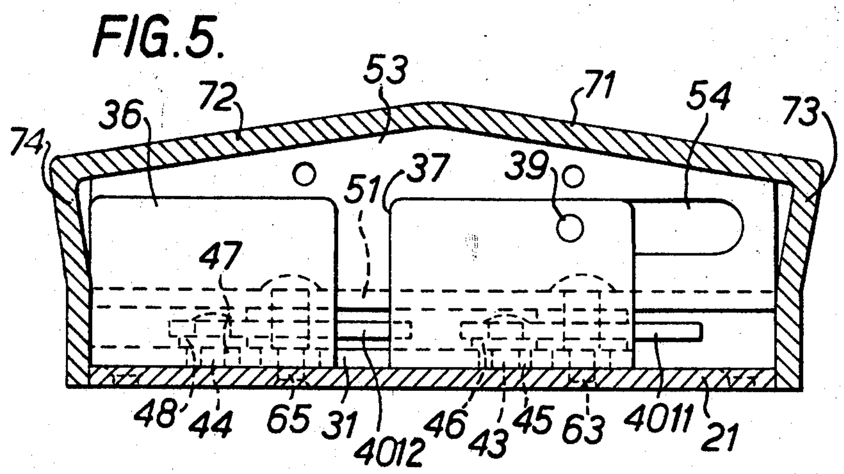
FIG. 5 is a section along the line V—V of FIG. 4.
Figure 6:
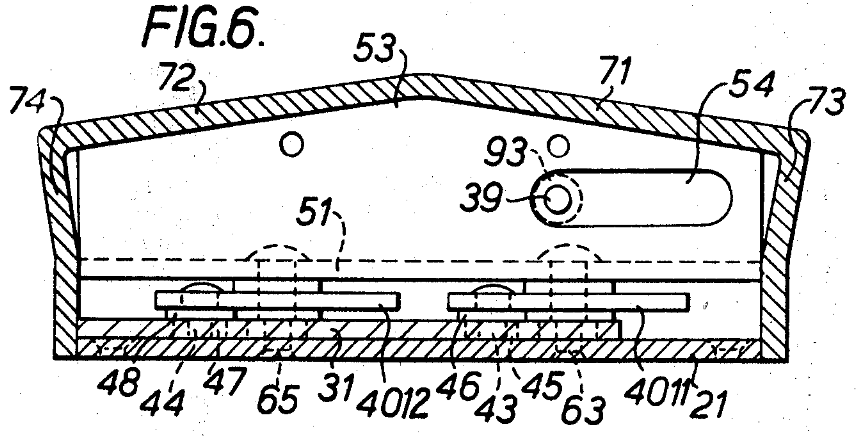
FIG. 6 is a section along the line VI—VI of FIG. 4.
Figure 10:
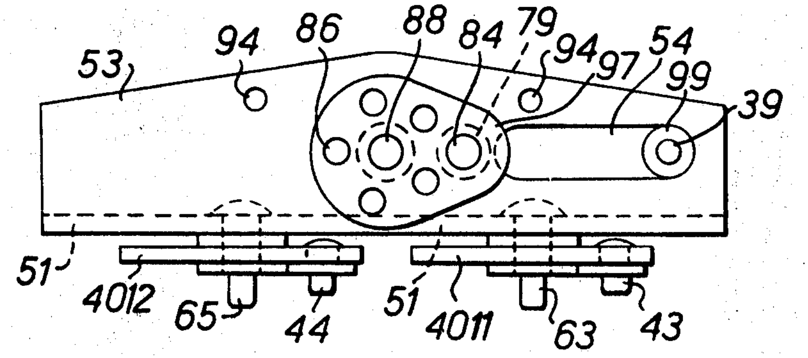
FIG. 10 is a rear elevational view in the "closed" position) with the slide removed for clarity.
Figure 7:
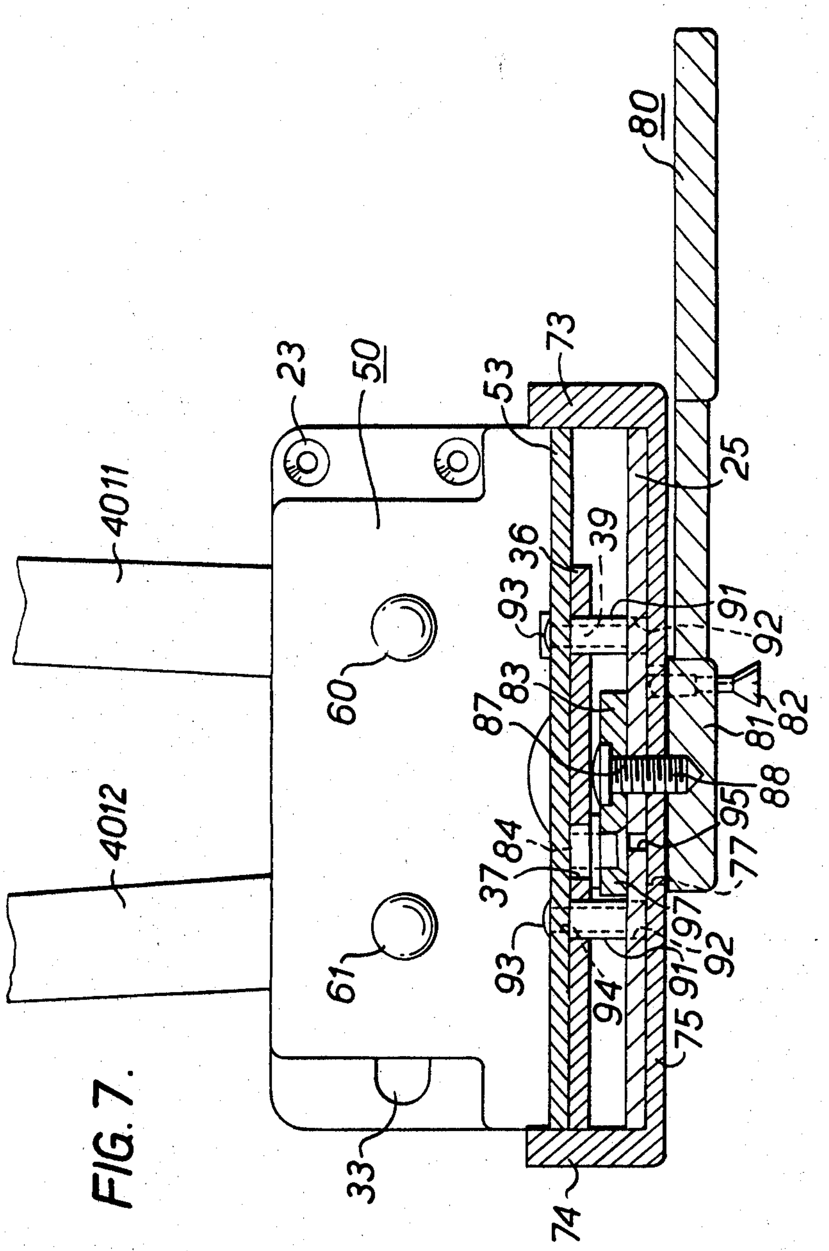
FIG. 7 is a section along the line VII—VII of FIG. 4.
Figure 8:
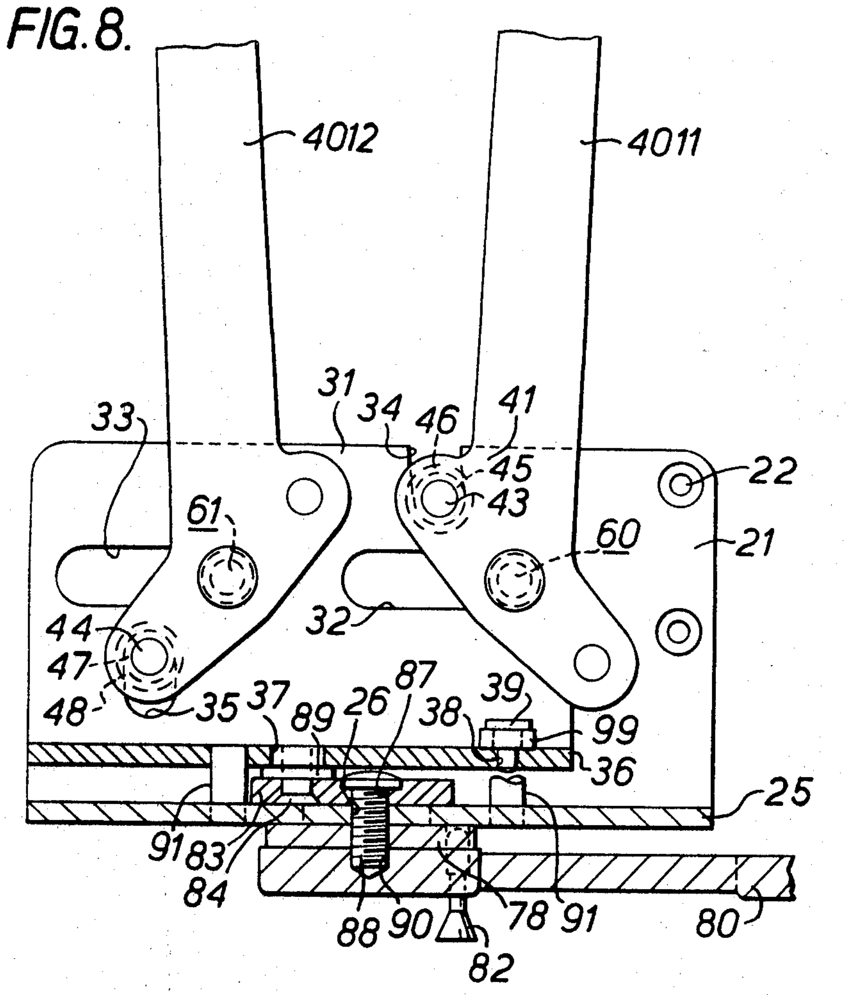
FIG. 8 is a section along the line VIII—VIII of FIG. 4 with the cover removed for clarity.
Figure 9:
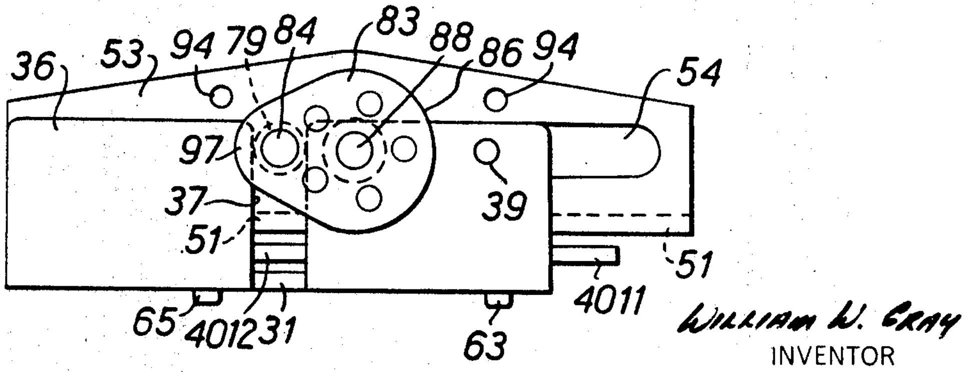
FIG. 9 is a section along the line IX—IX of FIG. 4 in the "open" position.
Figure 11:
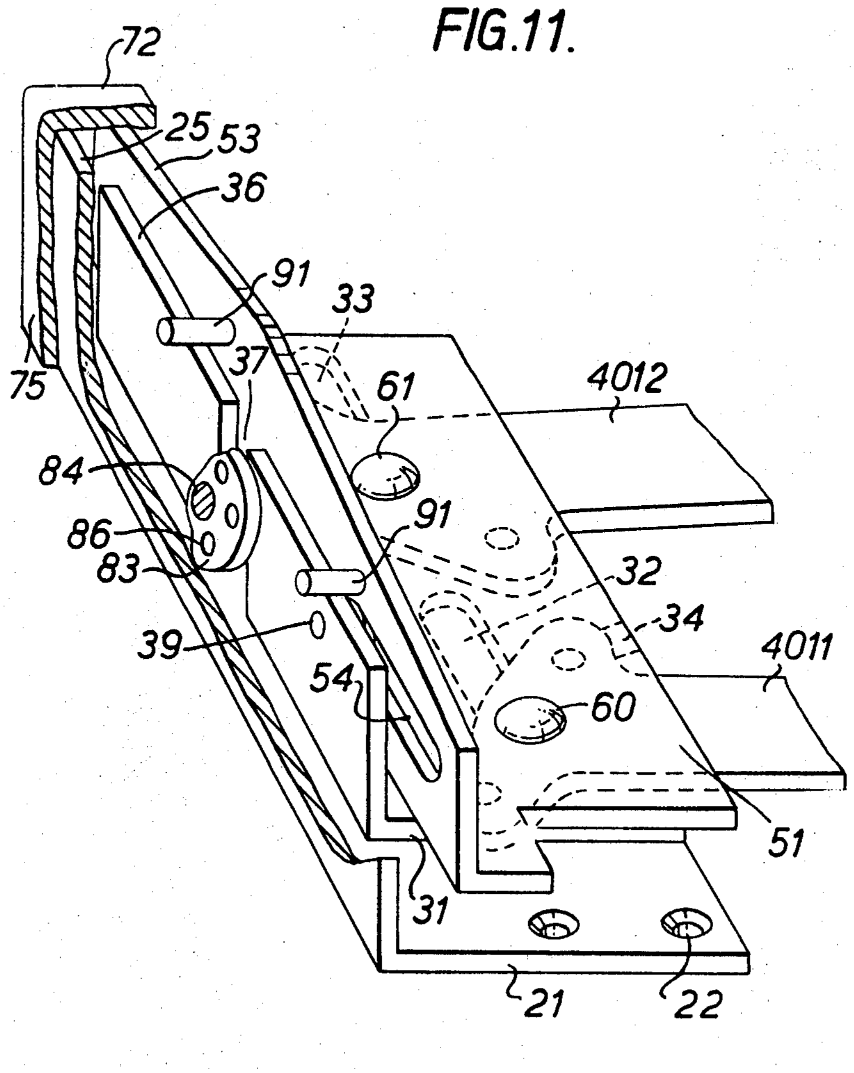
FIG. 11 is an isometric sketch of the embodiment of FIG. 2 with certain parts broken away and others not shown in order to depict the window operator in more clear form.

In operation, assuming that the operator is disposed in the configuration shown in FIGS. 5, 6 and 7, with the window open, pin 82 is withdrawn, and the handle 80 is raised, thus causing rotor pin 88 to rotate in a counterclockwise direction. The eccentric rotor 83 also rotates in a counterclockwise direction. This rotation of the eccentric rotor 83 causes rotor pin 84 to be drawn generally downwardly and inwardly, as viewed in FIG. 5. This downward and inward movement causes the circumferential faces of the roller 79 on the rotor pin 84 to contact the side walls of the slot 37. Thus, the roller 79 on the rotor pin 84 acts as a cam, and the surfaces of the walls of slot 37 act as a cam follower.

Figure 4:
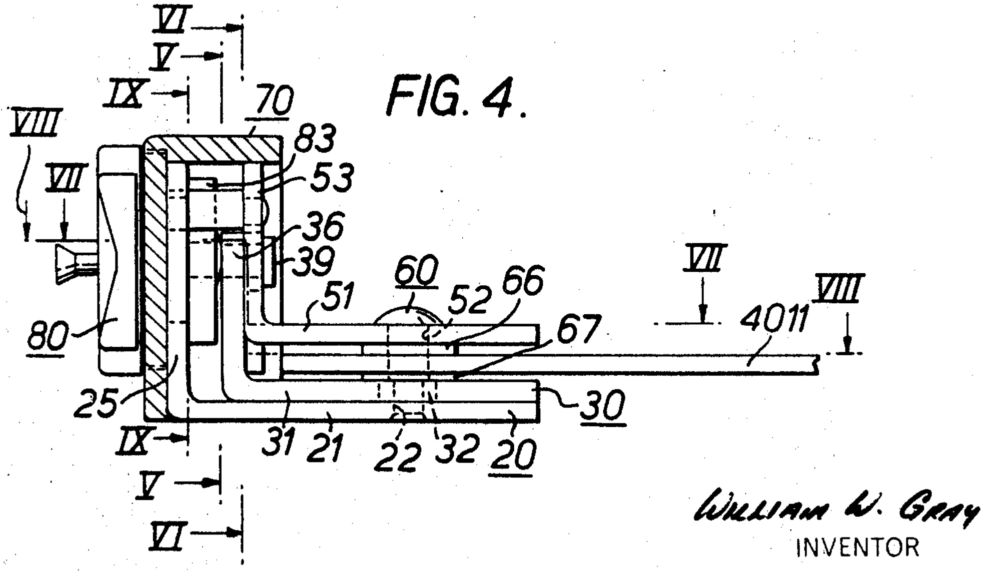
FIG. 4 is a partial side elevational view of the embodiment shown in FIG. 2, with the cover shown in central vertical section.

Accordingly, as the eccentric rotor 83 is rotated in a countercolckwise direction, the slide 30 is urged to slide in a direction from left to right as shown in FIG. 7. This sliding motion is facilitated by the presence of slots 33 which accommodate assembly rivet 61 and slot 32 which accommodates assembly rivet 60. The sliding movement is further guided by means of glide pin 39 gliding in glide slot 54. The sliding of slide 30 causes slot 35 and slot 34 to be displaced to the right as seen in FIGS. 4, 5 and 6. Displacement of slot 35 to the right will cause second lever pin 44 to follow a circumferential path downwardly and inwardly, the radius of the path being the distance between the second lever pin 44 and the second assembly rivet 61. This movement causes the second lever arm 4012 to rotate in a counterclockwise direction as viewed in FIG. 6, thereby tending to close the window. At substantially the same time, moreover, displacement of slot 34 tends to cause first lever pin 43 to follow a circumferential path upwardly and outwardly as viewed in FIG. 7, the radius of the path being the distance between the first lever pin 43 and the first assembly rivet 60. This movement causes the first lever arm 4011 to be rotated in a clockwise direction as viewed in FIG. 6, thereby tending to close the window.

Conversely, when the window is in a closed position, movement of the handle 80 downwardly causes precisely the reverse action to take place, thereby tending to open the window.

The connections between the first and second lever arms 4011 and 4012 and the lower rail of the movable window sash have not been shown. However, any conventional type of connection such as those shown in U.S. Pats. 1,956,476; 2,013,608; 2,022,036; 2,043,349; and 2,172,668 or in fact, any other connection which is old in the art may be used. Moreover, a separable interconnector such as shown in FIGS. 33–37 and which will be described in greater detail hereinafter may be used.

Thus, applicant has provided by this embodiment of this aspect of this invention a window operator in which a simple lever action in which the lever rotates about the pivot point through approximately 180° and rotating in the plane of the window permits opening and closing of the window. The rotation of the handle through 180° causes the window-operating lever arms to rotate through approximately 85°, thus opening or closing the window. Provision is also made for automatically locking the window in the fully-open and fully-closed position. The particular arrangement of the slide 30 and the lever arms 4011 and 4012 enables the window to be "locked" in the open position, i.e., being retained open regardless of force applied to the lower sill of the window sash, by having the lever arms move over the center of their pivot parts 60, 61. In addition, the winodw is obviously "locked" in the closed position, i.e., being retained closed regardless of force applied to the lower sill of the window sash, since such force would tend to close the window. The window may also be locked in a partially-open, night latch position, by having lock pin 82 engage hole 95 formed in frontal portion 25 of base 20. It is readily seen that this window operator may be used for awnings, casements, and hopper-type windows.

Figures 12, 13:
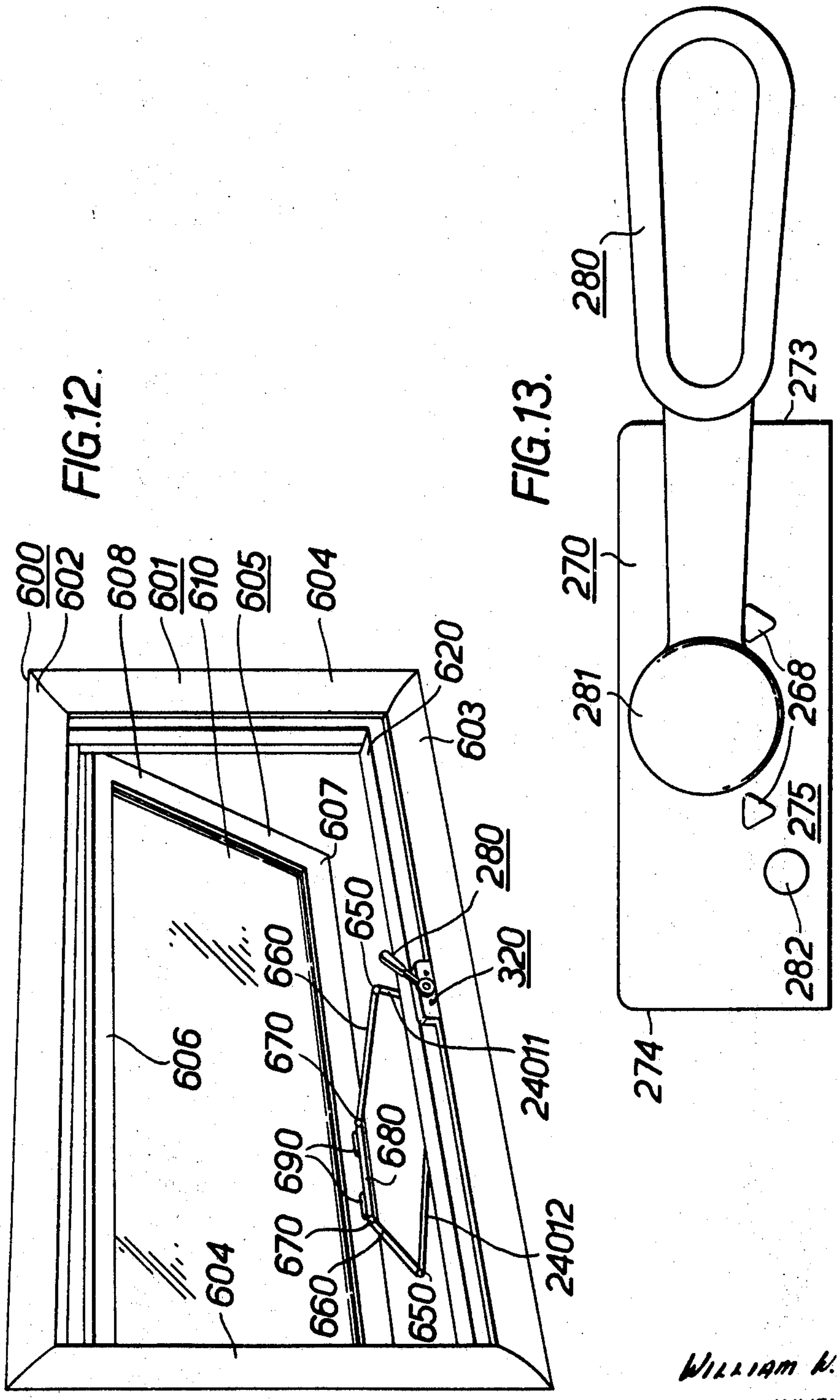
FIG. 12 is an interior elevational view of an open casement window provided with the window operator of another aspect of the invention.
FIG. 13 is a front elevational view of one embodiment of the window operator of a second aspect of this invention.

Turning now to FIG. 12, a casement-type window, shown generally as 600, includes a frame 601 composed of an upper rail 602, a lower sill 603 and a pair of side jambs 604. A window sash 605 includes upper and lower rails 606, 607, and side rails 608, 609 which are hingedly connected by hinges (not shown) to upper rail 602. The sash members 606, 607, 608, 609 surround and support a pane of glass 610. The inner periphery of the window frame is provided with a sash cover 620 (see FIG. 36), which may, if desired, be used to accommodate a screen 621.

Secured to the lower sill 603 is the window operator 320 of another embodiment of an aspect of this invention. The lever arms 24011, 24012 are secured by pins 650 to secondary lever arms 660. These secondary lever arms 660 are secured by secondary pins 670 to a tie bar 680 which is secured to bracket 690 which, in turn, is secured to lower rail 607 of sash 605. Tie bar 680 may be detachably secured by conventional means to bracket 690, so taht the window may be removed for cleaning or other purposes. On the other hand, tie bar 680 may be detachably secured to the bracket 690 by the means shown in FIGS. 33–37 herein. While a full description will be provided hereinafter, briefly, the connector may be described as comprising a bracket 690 secured to the window sash as by screws 654, the bracket including an inwardly extending ledge 694. The ledge 694 includes at least one longitudially extending slot 695, and preferably a pair of such longitudinally spaced apart, longitudinally extending slots 695. A latch bar 698 is slidably secured to the inner face 691 of the bracket 690, the latch bar 698 including at least one inwardly extending projection 700 overhanging the longitudinally extending slot 695, preferably a pair of such longitudinally extending projections 700, each of the projections overhanging a selected one of the slots 695, so as to provide restricted access to the slots 695.

The tie bar 680 also includes a downwardly projecting finger 682 which projects into, and cooperates with the slot 695, and preferably a pair of downwardly projecting, longitudinally spaced apart fingers 685, which each project into, and cooperate with, an associated one of the slots 695.

The window operator 320 of the embodiment shown in the drawings in FIGS. 13–22 comprises a stacked arrangement of an L-shaped base member 220, lever arms 24011 and 24012, an L-shaped slide member 230, and an L-shaped back member 250. The base member 220, the slide member 230 and the back member 250 are secured together, with the first lever arm 24011 and the second lever arm 24012 disposed between base member 220 and slide member 230 by means of an assembly rivet 260 for the first lever arm 24011 and an assembly rivet 261 for the second lever arm 24012. The front portion of the window operator is covered by a cover 270. A handle 280 is mounted for oscillation in a plane perpendicular to the axis of rotation of arms 24011 and 24012 and forms part of the window operator 320.

The base member 220 includes a base plate 221, provided with a plurality of marginal assembly apertures 222, in this case four. When the window operator 320 is mounted on the window sill 603, it is secured to the sill 603 by means of screws 224. The base member 220 also includes a frontal portion 225 which is provided with a centrally-disposed mounting aperture 226 whose cooperation with the remainder of the elements of the window operator will be explained hereinafter.

The first lever arm 24011 includes a laterally extending operator portion 241, and, similarly, the second lever arm 24012 includes a laterally extending operator portion 242. The laterally extending portion 241 is provided with a first lever pin 243, which is rotationally mounted in a first bearing 245 which, in turn, is slidably mounted with respect to slot 234. Similarly, the laterally extending operator portion 242 is provided with a second lever pin 244, which is rotationally mounted in a second bearing 247, which, in turn, is slidably mounted with respect to slot 235.

The slide 230 includese a slide plate 231 disposed in generally parallel relationship to the base plate 221. The slide plate 231 includes a first longitudinally extending slot 232 and a second longitudinally extending slot 233. In addition, the slide plate includes a first transversely extending marginal slot 234 and a second transversely extending slot 235, disposed angularly opposite from the first slot 234.

The slide 230 also includes an actuating portion 236 disposed generally perpendicularly to the slide plate 231. The actuating portion is provided with a central vertical transverse slot 237 extending to the intersection of the slide plate 231 and the actuating portion 236. The area of the actuating portion 236 adjacent slot 237 is substantially higher than the lateral wing portions 238, thereby providing a pair of spaced apart, intermediate, upstanding limit surfaces 239.

The back 250 includes a back member 251 extending in a plane generally parallel to the plane of base plate 221, slide plate 231 and lever arms 24011 and 14012. The back member 251 is provided with a pair of assembly apertures 252 through which an assembly rivet 260 for the first lever arm 24011 and an assembly rivet 261 for the second lever arm 24012, are each respectively adapted to pass. Assembly rivets 260, 261 include head portions 262, 264 and tail portions 263, 265, respectively, for securing the rivets together. The back member 251 also includes an upright frontal portion 253. The frontal portion 253 is provided with a pair of openings 294 to enable the back 250 to be secured to the base member 220. A pair of spacing cylinders 291, formed as projections of the cover 270, are secured in longitudinally spaced apart apertures 292 in frontal portions 225 of base member 220. The cylinders 291 extend from the interior of front face 275, through opening 292 in frontal portion 225 and to the frontal portion 253 of back 250, and smaller diameter cylindrical extensions 255 thereon extend through openings 294 in frontal portion 253, thereby providing riveting means for the entire assembly. The ledge between portions 291 and 255 accurately spaces frontal portion 253 from frontal portion 225. Cylinders 291 also abut corresponding limit surfaces 239 to assist in limiting the movement of slide 230.

The cover 270 is provided with a roof portion 271, a first depending wall portion 273, a second depending wall portion 274, and a front face 275. The front face 275 is provided with a centrally-disposed circular, handle-mounting aperture 277. Mounted in an aperture 266 in the front face 275 is a lock pin 282, which extends through an aperture 267 in the frontal portion 225 of the base 220, and finally bears against the slide 230. In addition, a pair of triangularly shaped protuberances 268 are formed on the front face 275 to provide positive stops for the oscillation of the handle 280.

The window operator is manually actuated by means of a handle 280, which includes a hub portion 281, and a spacer portion 278. Spacer portion 278 includes a first cylindrical portion 246 fitted within aperture 277 of front face 270, and a second cylindrical portion 248, fitted within aperture 226 in frontal portion 225. The handle 280 is pivotally mounted on the frontal portion 225 of the base member 220 by means of rotor rivets 288 which pass through the rotor 283 and provide riveting means for affixing the rotor 283 to the handle 280. Thus, disposed behind the frontal portion 225 is an eccentric rotor 283, provided with a rotor pin 284 on which is rotationally mounted a structurally rigid bushing 279, the pin 284 being in the eccentric portion 297 thereof. Apertures 287 are located in the rotor 283, through which rotor rivets 288 pass.

Figure 16:
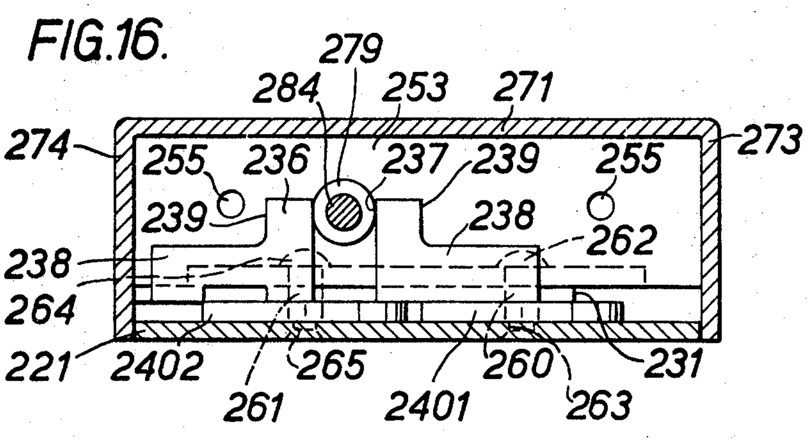
FIG. 16 is a section along the line XVI—XVI of FIG. 15.
Figure 17:
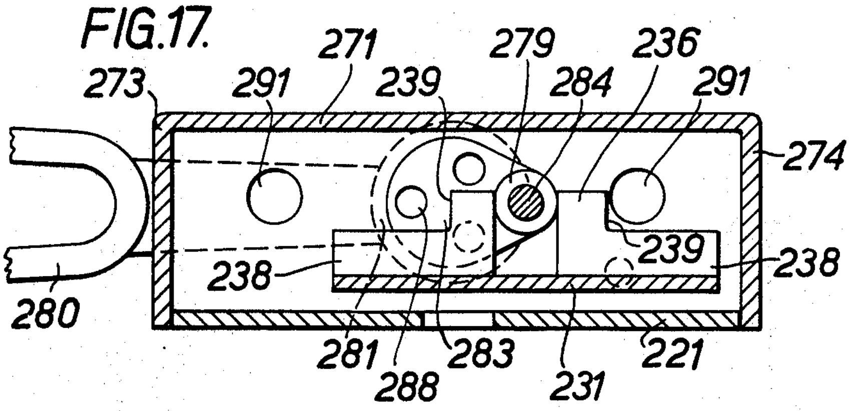
FIG. 17 is a section along the line XVII—XVII of FIG 15.
Figure 21:
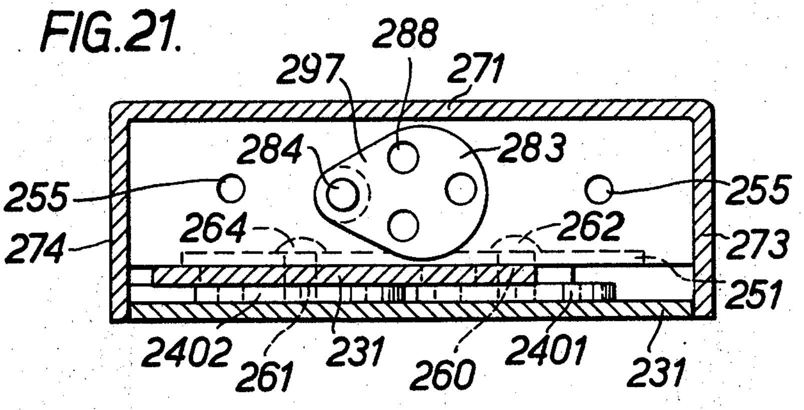
FIG. 21 is a rear elevational view (in the "closed" position), with the slide removed for clarity.
Figure 18:
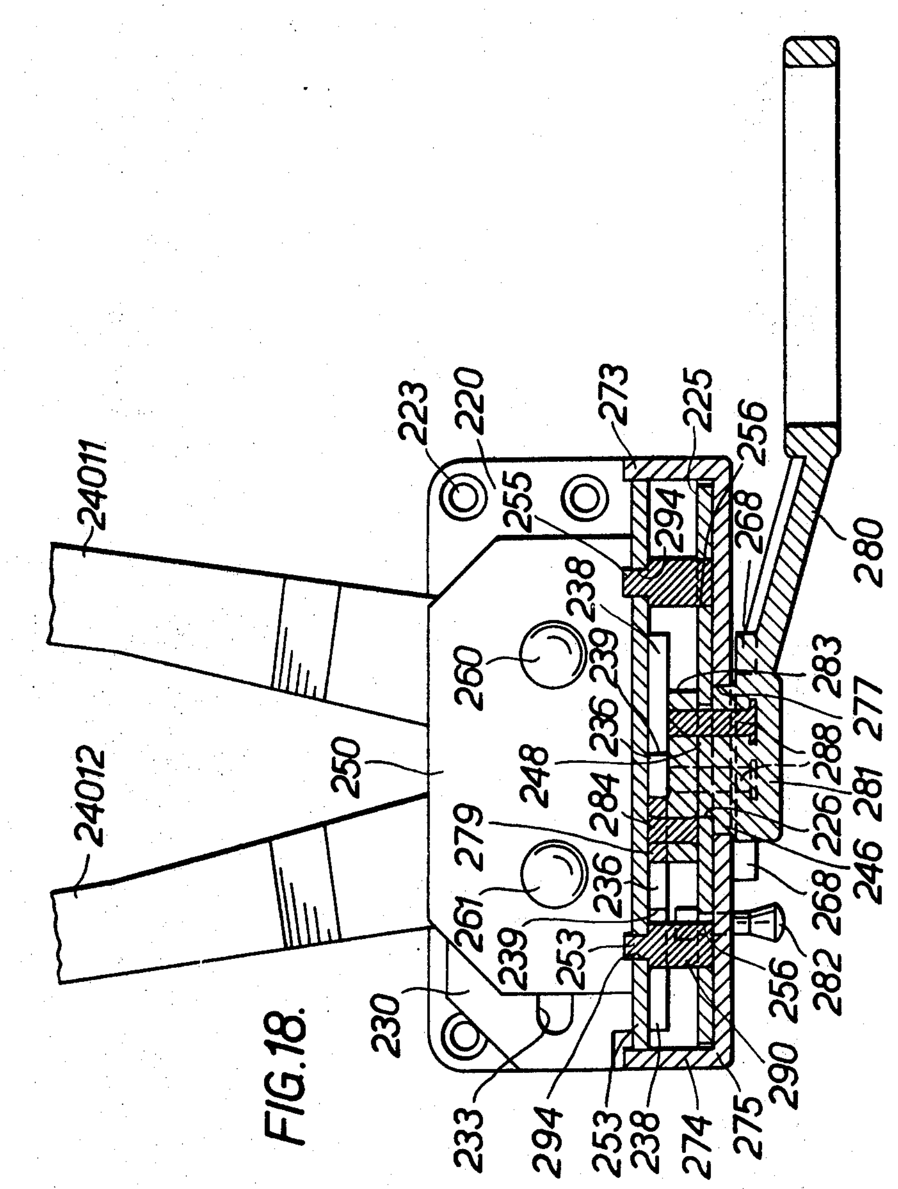
FIG. 18 is a section along the line XVIII—XVIII of FIG. 15.
Figure 19:
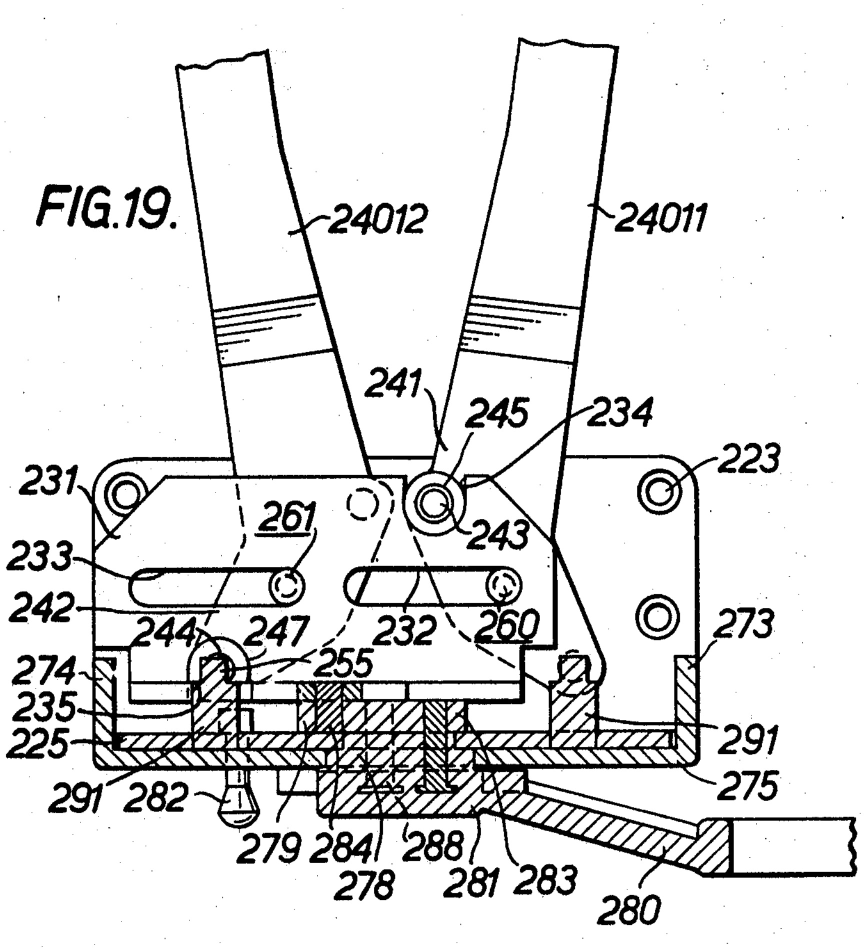
FIG. 19 is a section along the line XIX—XIX of FIG. 15, with the cover removed for clarity.
Figure 20:
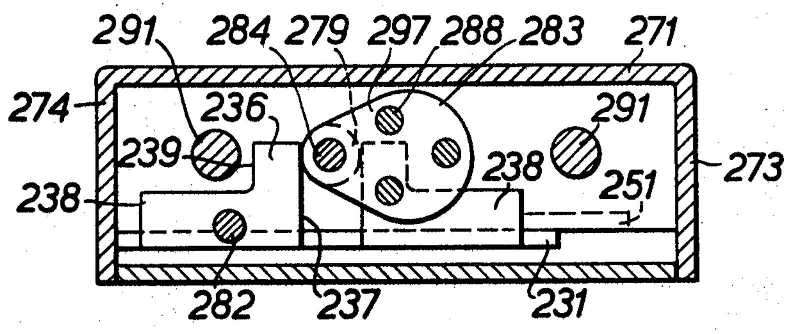
FIG. 20 is a section along the line XX—XX of FIG. 15, in th "open" position.
Figure 22:
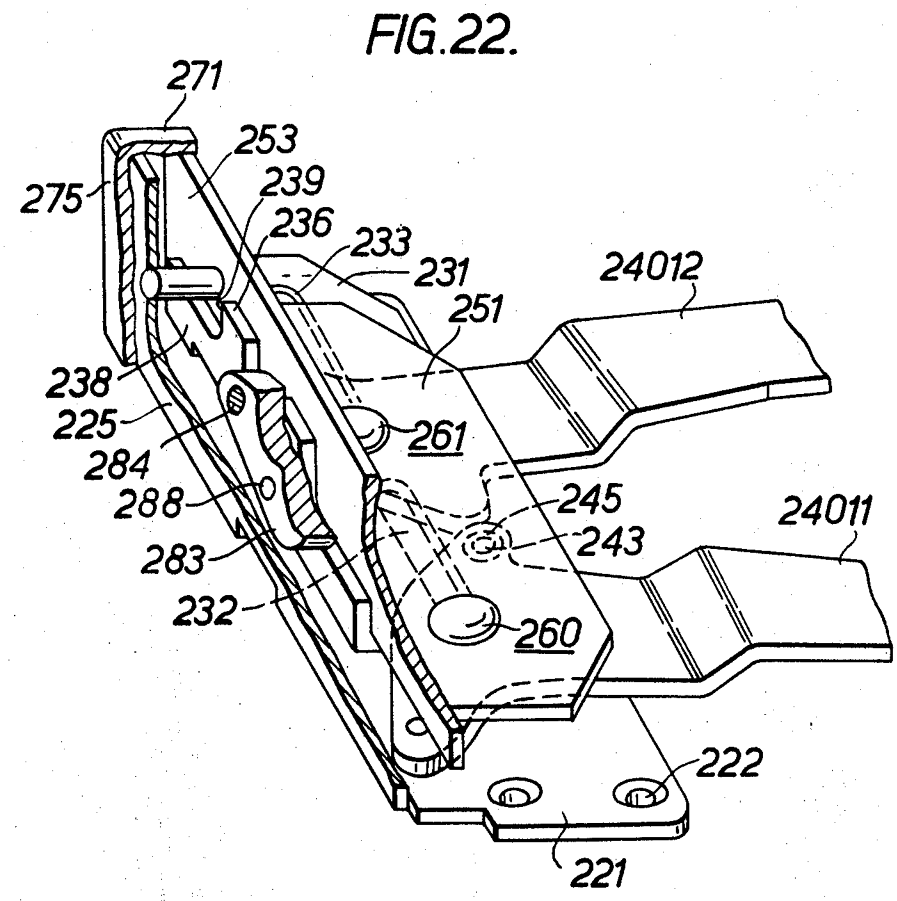
FIG. 22 is an isometric sketch of the embodiment of FIG. 15, with certain parts broken away and others not shown in order to depict the window operator in more clear form.
Figure 23:
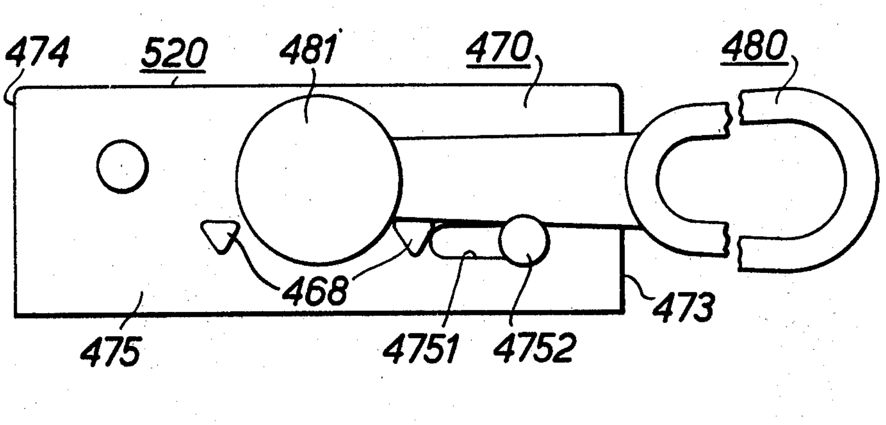
FIG. 23 is a front elevational view of one embodiment of the window operator of a third aspect of this invention.
Figure 24:
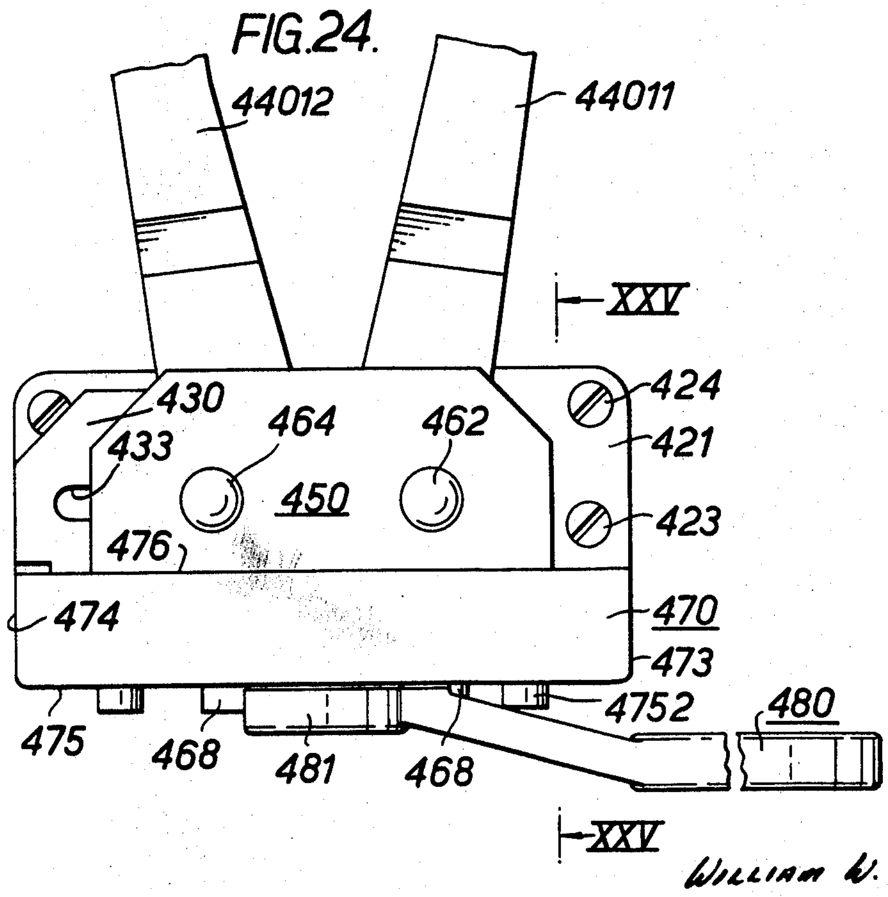
FIG. 24 is a top plan view of the embodiment shown in FIG. 23.
Figure 25:
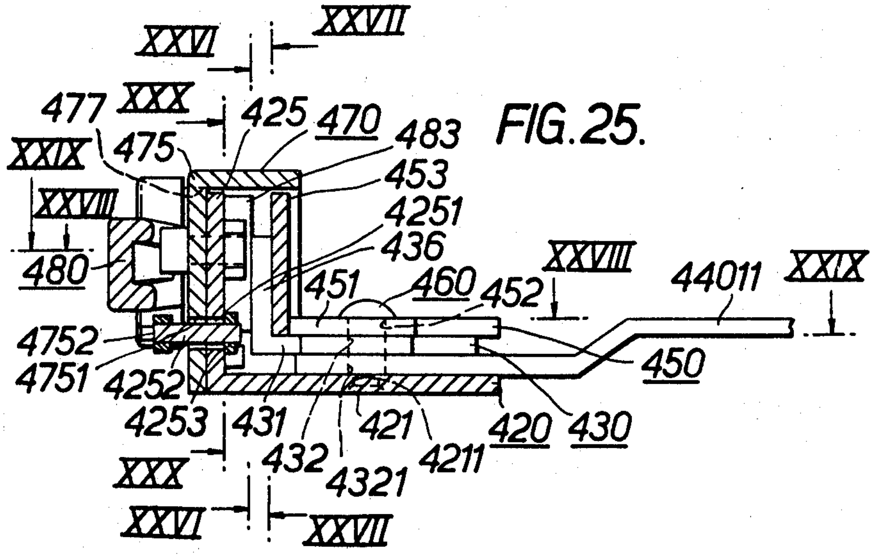
FIG. 25 is a partial side elevational view of the embodiment shown in FIG. 23 with the cover shown in central vertical section.

In operation, assuming that the operator is disposed in the configuration shown in FIGS. 16, 17 and 18, with the window open, the handle 280 is raised, thus causing rotor pin 288 to rotate in a counterclockwise direction. The eccentric rotor 283 also rotates in a counterclockwise direction. This rotation of the eccentric rotor 283 causes rotor pin 284 to be drawn generally downwardly and inwardly, as viewed in FIG. 16. This downward and inward movement causes the circumferential faces of the roller 279 on the rotor pin 284 to contact the side walls of the slot 237. Thus, the roller 279 on the roller pin 284 acts as a cam, and the surfaces of the walls of slot 237 act as a cam follower.

Figures 14, 15:
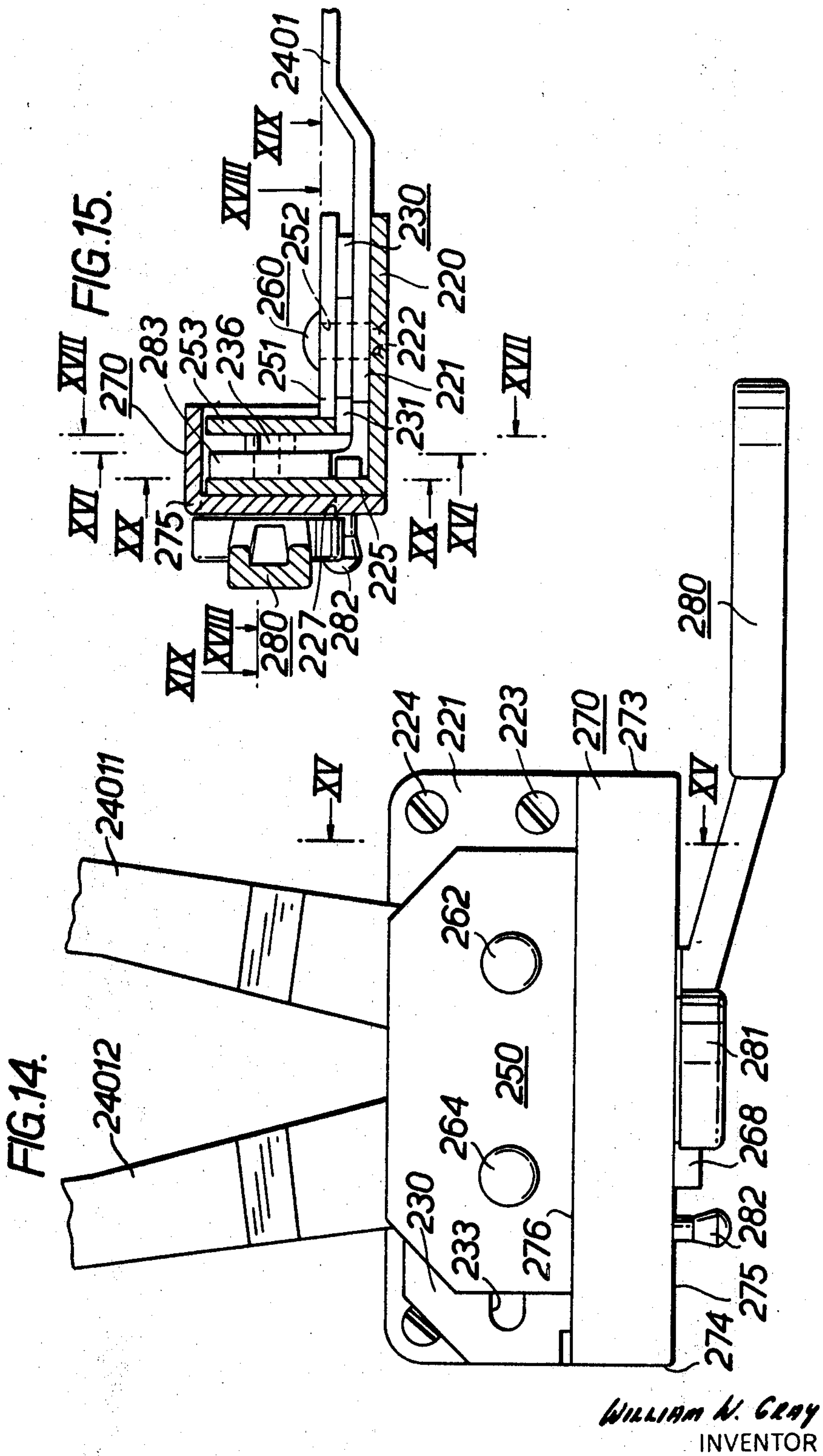
FIG. 14 is a top plan view of the embodiment in FIG. 13.
FIG. 15 is a partial side elevational view of the embodiment shown in FIG. 13 with the cover shown in central vertical section.

Accordingly, as the eccentric rotor 283 is rotated in a counterclockwise direction, the slide 230 is urged to slide in a direction from left to right as shown in FIG. 18. This sliding motion is facilitated by the presence of slots 233 which accommodate assembly rivet 261 and slot 232 which accommodates assembly rivet 260. The sliding of slide 230 causes slot 235 and slot 234 to be displaced to the right as seen in FIGS. 15, 16 and 17. Displacement of slot 235 to the right will cause second lever pin 244 to follow a circumferential path downwardly and inwardly, the radius of the path being the distance between the second lever pin 244 and the second assembly rivet 261. This movement causes the second lever arm 24012 to rotate in a counterclockwise direction as viewed in FIG. 17, thereby tending to close the window. At substantially the same time, however, displacement of slot 234 tends to cause first lever pin 243 to follow a circumferential path upwardly and outwardly as viewed in FIG. 18, the radius of the path being the distance between the first lever pin 243 and the first assembly rivet 260. This movement causes the first lever arm 24011 to be rotated in a clockwise direction as viewed in FIG. 17, thereby also tending to close the window.

Conversely, when the window is in a closed position, movement of the handle 280 downwardly causes precisely the reverse action to take place, thereby tending to open the window.

The connections between the first and second lever arms 24011, 24012 and the secondary lever arms 323, 324, and between the secondary lever arms 323, 324 and lower rail 607 have been described hereinbefore with particular reference to FIGS. 33–37. While it is preferred to use that particular construction for providing a separable interconnection between the window operator 320 and the sash 605, any conventional type of connection such as those shown in U.S. Pats. Nos. 1,956,476; 2,013,608; 2,022,036; 2,043,349; and 2,172,668 or, in fact, any other connection which is old in the art may be used.

Thus, applicant has provided herein with this embodiment, a window operator in which a simple lever action in which the lever rotates about the pivot point through approximately 180° and rotating in the plane of the window permits opening and closing of the window. The rotation of the handle through 180° causes the window-operating lever arms to rotate through approximately 85°, thus opening or closing the window. Provision is also made for automatically locking the window in the fully-open and fully-closed position. The particular arrangement of the slide 230 and the lever arms 24011 and 24012 enables the window to be "locked" in the fully-open position, i.e. being retained open regardless of force applied to the lower sill of the window sash, by having the lever arms move over the center of their pivot points 260, 261. In addition, the window is obviously "locked" in the fully-closed position, i.e. being retained closed regardless of force applied to the lower sill of the window sash, since such force would tend to close the window. Finally, the window may also be locked in a partially open or "night-latch" position, by having lock pin 282 engage the slide member 230. It is readily seen that this embodiment of the window operator as provided herein may be used for awning, casement, and hopper-type windows.

The window operator 520 of the embodiment shown in the drawings in FIGS. 23–32 comprises a stacked arrangement of an L-shaped base meember 420, lever arms 44011 and 44012, an L-shaped slide member 430, and an L-shaped back member 450. The base member 420, the slide member 430 and the back member 450 are secured together, with the first lever arm 44011 and the second lever arm 44012 disposed between base member 420 and slide member 430, by means of an assembly rivet 460 associated with the first lever arm 44011 and an assembly rivet 461 associated with the second lever arm 44012. The front portion of the window operator is covered by a cover 470. A handle 480 is mounted, in a manner to be described hereinafter, for oscillation in a plane perpendicular to the axis of rotation of arms 44011 and 44012 and forms part of the window operator.

The base member 420 includes a base plate 421, provided with a plurality of marginal assembly apertures 422, in this case four. When the window operator is mounted on a window sill, such as 603 shown in FIG. 12, it is secured to the sill by means of screws 424. The base member 420 also includes a frontal portion 425 which is provided with a centrally disposed mounting aperture 426 whose cooperation with the remainder of the elements of the window operator will be explained hereinafter. The frontal portion 425 is also provided with a horizontally extending slot 4251 in registry with a similar slot 4751 in the frontal portion 475 of the cover 470.

Extending through the slot is a lock pin 4252, of a diameter slightly smaller than the width of slots 4251 and 4751, so that it may slide therein. The inner end of pin 4252 is provided with a rectangular night latch 4253 rigidly secured thereon, as by peening the end of the pin 4252 which extends through an aperture in latch 4253. The outer end of pin 4252 which extends from slot 4751 is provided with a decorative knob 4752, rigidly secured thereon or integral therewith. The operation of the night latch mechanism will be described hereinafter.

The first lever arm 44011 includes a laterally extending operator portion 441, and similarly, the second lever arm 44012 includes a laterally extending operator portion 442. The laterally extending portion 441 is provided with a rigidly mounted lever pin 443. The lever pin 443 extends through the central aperture of a first bushing 445 which is slidably mounted in slot 434. Thus, pin 443 may rotate with respect to bushing 445. Similarly, the laterally extending operator portion 442 is provided with a rigidly mounted lever pin 444 which extends through the aperture of a second bushing 447 which is slidably mounted in slot 446. Thus, pin 444 may rotate with respect to bushing 447.

The slide 430 includes a slide plate 431 disposed in generally parallel relationship to the base plate 421. The slide plate 431 includes a first longitudinally extending slot 432 and a second longitudinally extending slot 433. In addition, the slide plate includes the first transversely extending marginal slot 434, in which bushing 445 is slidably mounted and the second transversely extending slot 446, in which bushing 447 is slidably mounted, and disposed diametrically opposite from the first slot 434.

The slide 430 also includes an actuating portion 436 disposed generally perpendicularly to the slide plate 431. The actuating portion 436 is provided with a central, vertical, transverse slot 437 extending from the upper edge of actuating portion 436 downwardly to the intersection of the slide plate 431 and the actuating portion 436.

The back 450 includes a back member 451 extending in a plane generally parallel to the plane of base plate 421, slide plate 431 and lever arms 44011 and 44012. The back member 451 is provided with a pair of assembly apertures 452 through which an assembly rivet 460 for the first lever arm 44011 passes, and through which an assembly rivet 461 for the second lever arm 44012 passes. Assembly rivet 460 includes a head portion 462 and a tail portion 463 securing the rivet together. Similarly, assembly rivet 461 includes a head portion 464 and a tail portion 465 securing the rivet together. Assembly rivet 460 thus passes through the first aperture 452 in back member 451, is slidably mounted with respect to slot 432, passes through aperture 4321 in lever arm 44011 to be rotationally mounted with respect thereto, and finally through aperture 4211 in base plate 421, to be secured therein by tail portion 463. Similarly, assembly rivet 461 passes through the other aperture 452 in back member 451, is slidably mounted with respect to slot 433, passes through aperture 4331 in lever arm 44012 to be rotationally mounted with respect thereto, and finally through aperture 4212 in base plate 421, to be secured therein by tail 465. The back member 451 also includes an upright frontal portion 453. The frontal portion 453, being at the back of the window operator provides a dorsal protective plate, and is covered by the roof portion 471 of cover 470.

The cover 470 is provided with a roof portion 471, a first depending side wall portion 473, a second depending side wall portion 474, and a front face 475. The front face 475 is provided with a centrally disposed circular, handle-mounting aperture 477. Front face 475 is also provided with a pair of apertures 4381, 4382, in registry with corresponding apertures 4383, 4384 in frontal portion 425 of base member 420. Extending through apertures 4381, 4383 is a securing bolt 4385 fastened by nut 4387 and, similarly, extending through apertures 4382, 4384 is a securing bolt 4386, fastened by nut 4388. In this manner, cover 470 and base member 420 are secured together. In addition, a pair of triangularly shaped protuberances 468 are formed on the front face 475 to provide positive stops for the oscillation of the handle 480.

The window operator is manually actuated by means of a handle 480, which includes a hub portion 481, and a spacer portion 478. Spacer portion 478 includes a first cylindrical portion 446 fitted within aperture 477 of front face 475 and rotationally mounted with respect thereto, and a second cylindrical portion 448, fitted within aperture 426 in frontal portion 425 and rotationally mounted with respect thereto. The handle 480 is secured to the front 475 of cover 470 and to the frontal portion 425 of the base member 420 by means of rotor rivets 488 which are secured to hub portion 481 and then pass through apertures 487 of the rotor 483 and provide riveting means of affixing the rotor 483 to the handle 480. Thus, disposed behind the frontal portion 425 is an eccentric rotor 483, provided with a rotor pin 484. Rotor pin 484 passes through the central aperture of bushing 479, which is slidably mounted with respect to slot 437 in slide 430. Thus, rotor pin 484 is rotationally mounted with respect to bushing 479, the pin 484 being in the eccentric portion 497 thereof.

Figure 26:
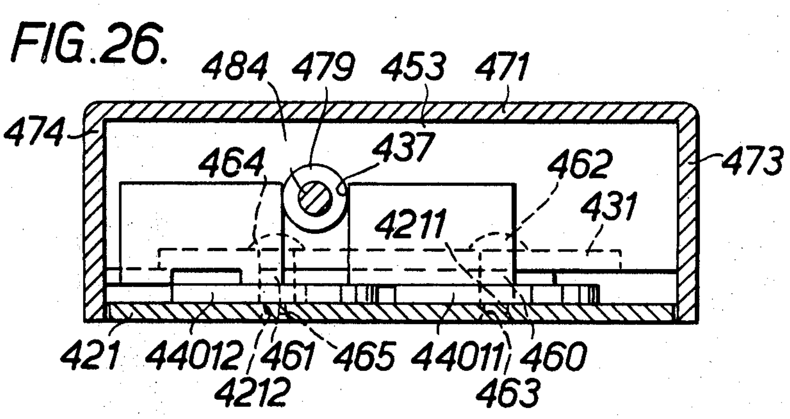
FIG. 26 is a section along the line XXVI—XXVI of FIG. 25.
Figure 27:
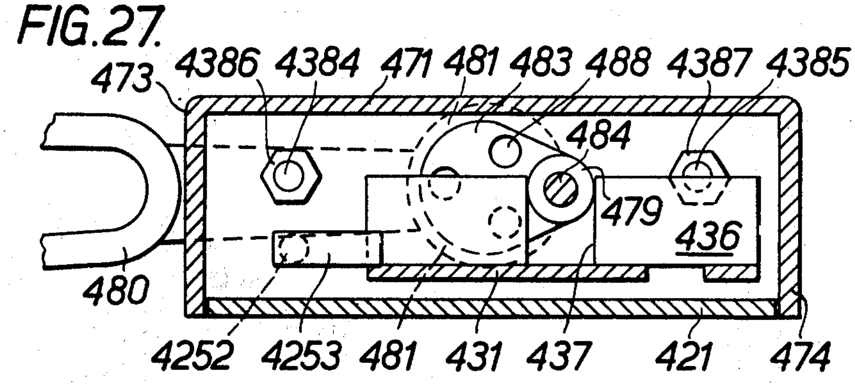
FIG. 27 is a section along the line XXVII—XXVII of FIG. 25.
Figure 28:
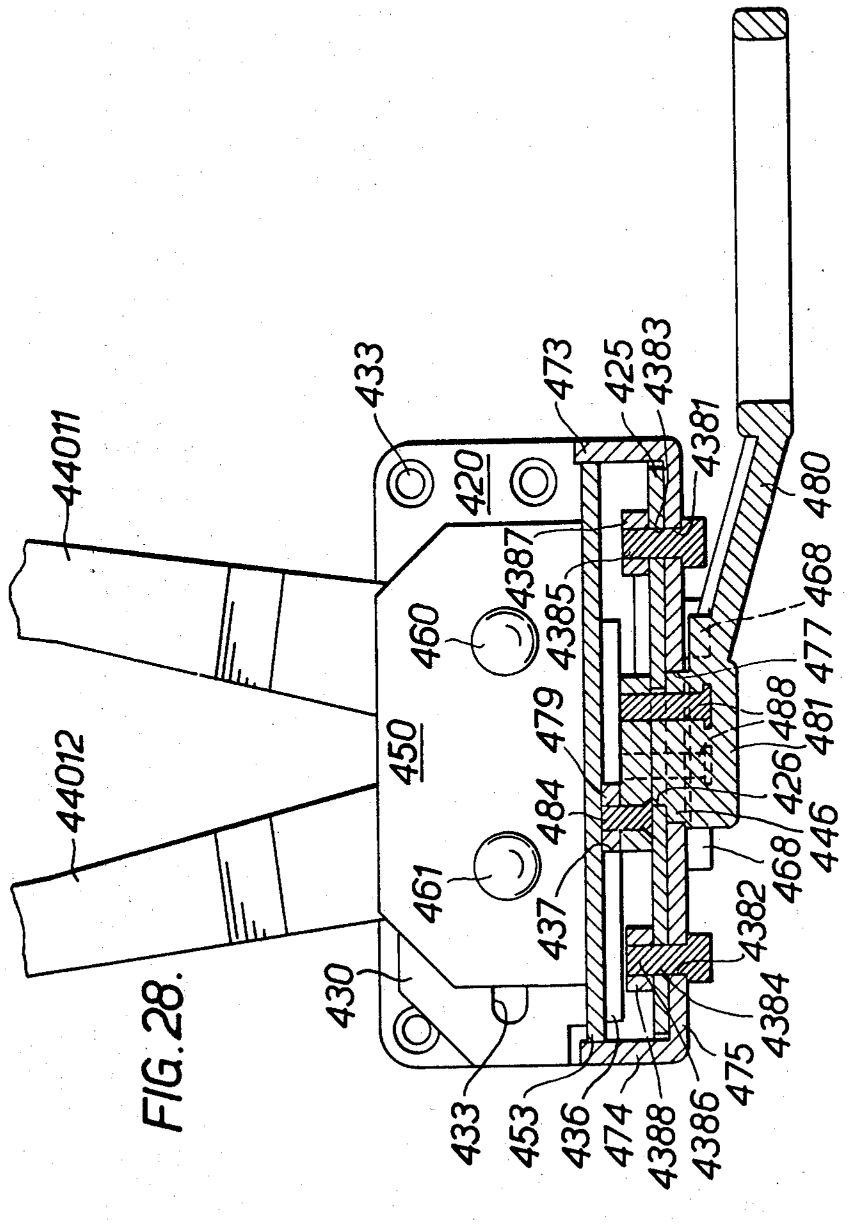
FIG. 28 is a section along the line XXVIII—XXVIII of FIG. 25.

In operation, assuming that the operator is disposed in the configuration shown in FIGS. 26, 27 and 28, with the window open, the handle 480 is raised, that is, oscillated from right to left as viewed in FIG. 28, thus causing eccentric rotor 483 and rotor pin 484 to rotate in a counterclockwise direction. This rotation of the eccentric rotor 483 causes rotor pin 484 to be drawn generally downwardly and inwardly, as viewed in FIG. 26. This downward and inward movement causes the circumferential faces of the bushing 479 on the rotor pin 484 to contact the side walls of the slot 437. Thus, the roller 479 on the rotor pin 484 acts as a cam, and the surface of the walls of slot 437 act as a cam follower.

Figure 29:
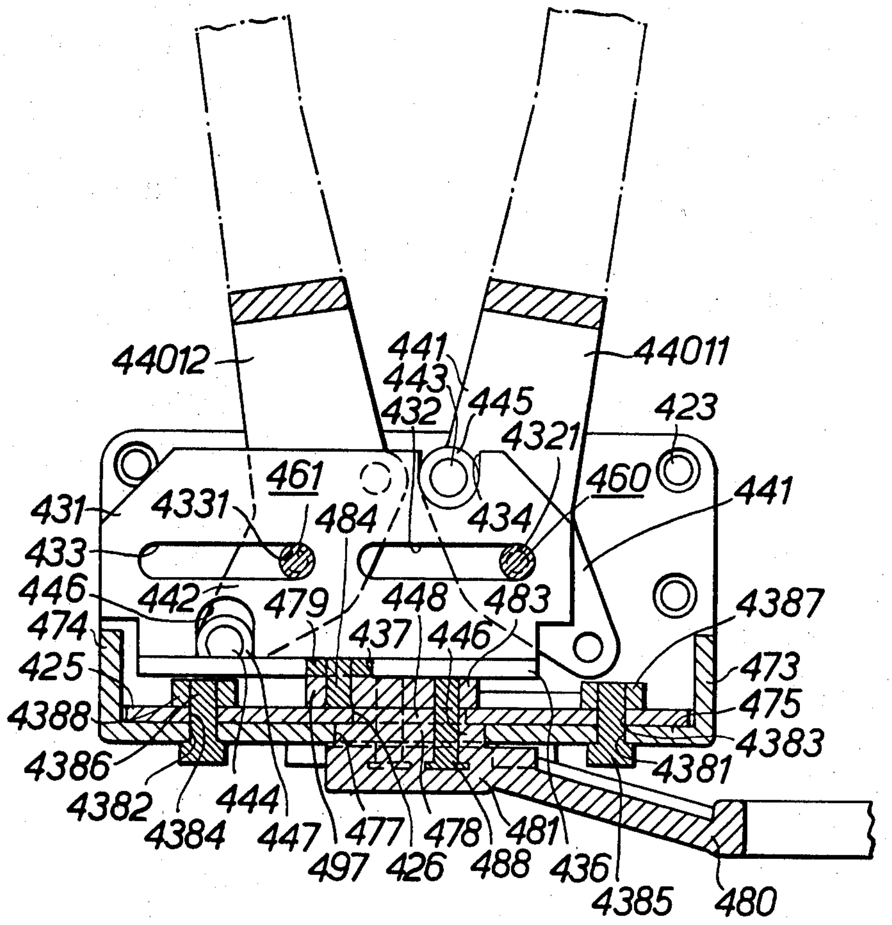
FIG. 29 is a section along the line XXIX—XXIX of FIG. 25, with the cover removed for clarity.
Figure 30:
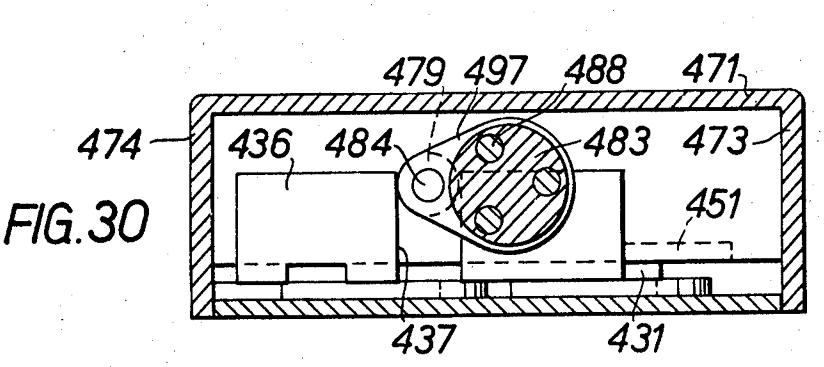
FIG. 30 is a section along the line XXX—XXX of FIG. 25, in the "open" position.
Figures 31, 32:
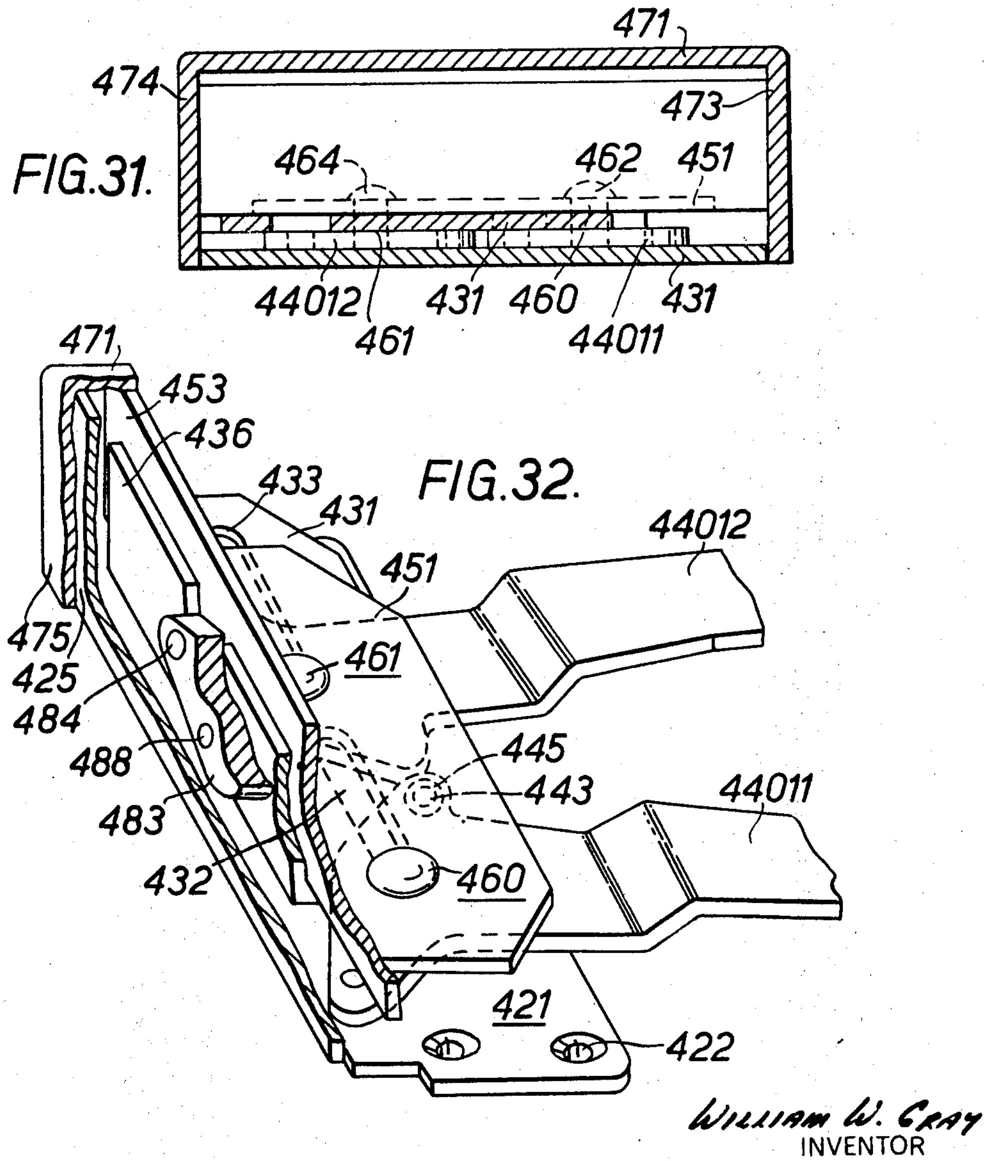
FIG. 31 is a rear elevational view (in the "closed" position), with the slide removed for clarity.
FIG. 32 is an isometric sketch of the embodiment of FIG. 25, with certain parts broken away and others not shown in order to depict the window operator in more clear form.

Accordingly, as the eccentric rotor 483 is rotated in a counterclockwise direction, the slide 430 is urged to slide in a direction from left to right as shown in FIG. 28. This sliding motion is guided by the presence of slot 433 which accommodates assembly rivet 461 and by slot 432 which accommodates assembly rivet 460. The sliding of slide 430 causes slot 435 and slot 434 to be displaced to the right as seen in FIG. 28. Displacement of slot 435 to the right will cause second lever pin 444 to follow a circumferential path downwardly and inwardly, as seen in FIG. 29, the radius of the path being the distance between the second lever pin 444 and the second assembly rivet 461. This movement causes the second lever arm 44012 to rotate in a counterclockwise direction as viewed in FIG. 29, thereby tending to close the window. At substantially the same time, moreover, displacement of slot 434 tends to cause first lever pin 443 to follow a circumferential path upwardly and outwardly as viewed in FIG. 29, the radius of the path being the distance between the first lever pin 443 and the first assembly rivet 460. This movement causes the first lever arm 44011 to be rotated in a clockwise direction as viewed in FIG. 29, thereby also tending to close the window.

Conversely, when the window is in a closed position, movement of the handle 480 in the opposite direction causes precisely the reverse action to take place, thereby tending to open the window.

The connections between the first and second lever arms 44011, 44012, the secondary lever arms 660, and the sill 607 of window 605, have been described hereinbefore with particular reference to FIG. 12. While it is preferred to use that particular construction for providing a separable interconnection between the window operator 520 and the sash 605, any conventional type of connection such as those shown in U.S. Pats. Nos. 1,956,476; 2,013,608; 2,022,036; 2,043,349; and 2,172,668 or in fact, any other connection which is old in the art may be used.

Thus, applicant has provided herein a window operator in which a simple lever action in which the lever rotates about a pivot point through approximately 180° and rotating in the plane of the window provides opening and closing of the window. The rotation of the handle through 180° causes the window-operating lever arms to rotate through approximately 85°, thus opening or closing the window. Provision is also made for automatically locking the window in the fully open and fully closed position. The particular arrangement of the slide 430 and the lever arms 44011 and 44012 enables the window to be "locked" in the open position, i.e., being retained open regardless of force applied to the lower sill of the window sash, by having the lever arms move over the centre of their pivot points 460, 461. In addition, the window is obviously "locked" in the closed position, i.e., being retained closed regardless of force applied to the lower sill of the window sash, since such force would tend to close the window. Finally, the window may also be locked in a partially open or "night-latch" position, by means of engagement of rectangular night latch 4253 with the eccentric portion 497 of rotor 483, thereby restricting severely the degree of rotation of rotor 483.

It is readily seen that this window operator as provided herein may be used for awning, casement, and hopper-type windows.

Figure 33:
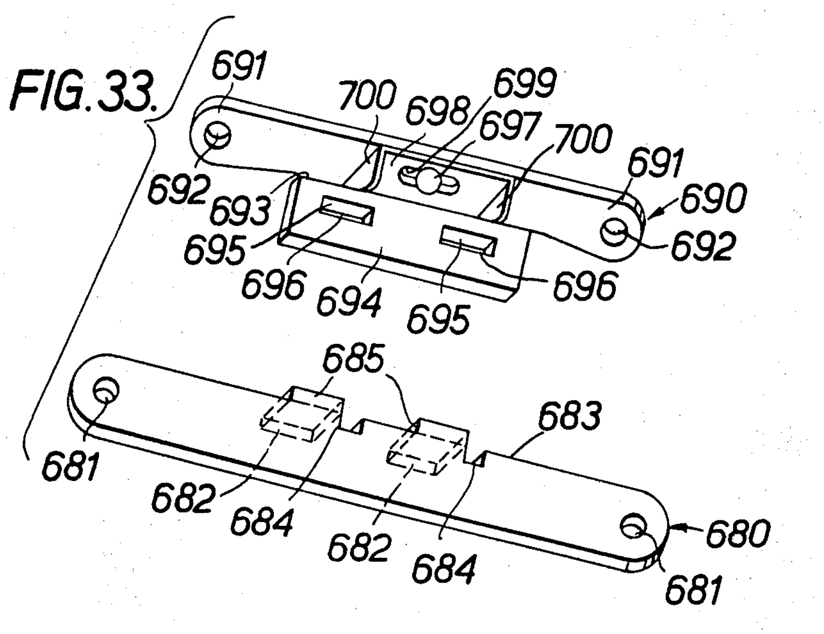
FIG. 33 is an exploded isometric view of one embodiment of a separable interconnector of a fourth aspect of this invention.

Turning now to FIGS. 33–36, the specific construction of the separable interconnector of an aspect of this invention may be seen from FIG. 33. The bracket 690 is generally rectangular in shape provided with aesthetically curved ends 691, each provided with a mounting aperture 692. The central lower edge 693 thereof is provided with an integral perpendicular, inwardly extending ledge 694 including a pair of longitudinally spaced apart, longitudinally extending slots 695 therein. The leading edge 696 of each of slots 695 is bevelled rearwardly, preferably at an angle of about 45°.

Secured to and slidably mounted on the central vertical portion of the bracket 690 by means of a rivet 697 rigidly secured thereto is a latch bar 698. Latch bar 698 is provided with a longitudinally extending operating slot 699 which enables latch bar 698 to slide with respect to rivet 697. A pair of inwardly extending projections or ears 700 at the terminal ends of latch bar 698 are so disposed as to be moved to overhang the slots 695, thereby to provide restricted access to the slots 695.

The tie bar 680 is also of rounded ended, generally rectangular shape and includes a pair of terminal apertures 681 for attachment purposes. A pair of central fingers 682 depend from the leading edge 683 of tie bar 680. It is observed that the fingers 682 include a projection 685 which projects beyond edge 683 by an amount similar to the depth of slots 684 situated adjacent one end of each of fingers 682. The projections 685 and the slots 684 permit the engaging and the disengaging of fingers 682 with the slots 695 at will, but only when positively urged to do so.

Turning now to FIGS. 34, 35, 36 and 37, it is seen that a pair of primary lever arms 24011 and 24012 are mounted within operator 330 to be operated by such operator to oscillate in opposite directions to open and to close the window. Primary lever arms 24011 and 24012 are pivotally connected to secondary lever arms 660 by means of primary journal pins 650 respectively. As seen more clearly in FIGS. 35 and 36, primary lever arm 24011 is provided with an upwardly bent portion 6411, bent at an angle of about 45°, leading to a tertiary portion 6421, terminating at an upturned distal end 6431, bent upwardly preferably at an angle of about 30°. Similarly, primary lever arm 24012 is provided with an upwardly bent portion 6412, also bent at an angle of about 45°, leading to a tertiary portion 6421, terminating in an upturned distal end 6432, bent upwardly preferably at an angle of about 30°. Correspondingly, secondary lever arms 660 each include a main region 662 and a vanguard portion 661, downturned by an amount similar to the upturned distal ends 6431 of primary lever arm 24011, and 6432 of primary lever arm 24012.

Distal ends 643 are each provided with a journal aperture 644, and correspondingly vanguard portions 661 are each provided with a journal aperture 663. Primary journal pins 650 join end 6431 of lever arm 24011 and portion 661 together and similarly end 6432 and portion 661 together, there being a spring washer 651 disposed therebetween.

Secondary lever arms 660 are each pivotally secured to a respective one of the pair of terminal apertures 681 of tie bar 680 by means of secondary journal pins 670. As seen more clearly in FIGS. 34 and 36, the distal ends 664 are each provided with a journal aperture 665. Secondary journal pins 670 join distal ends 664 and tie bar 680 together, there being a spring washer 652 disposed therebetween.

Figure 37:
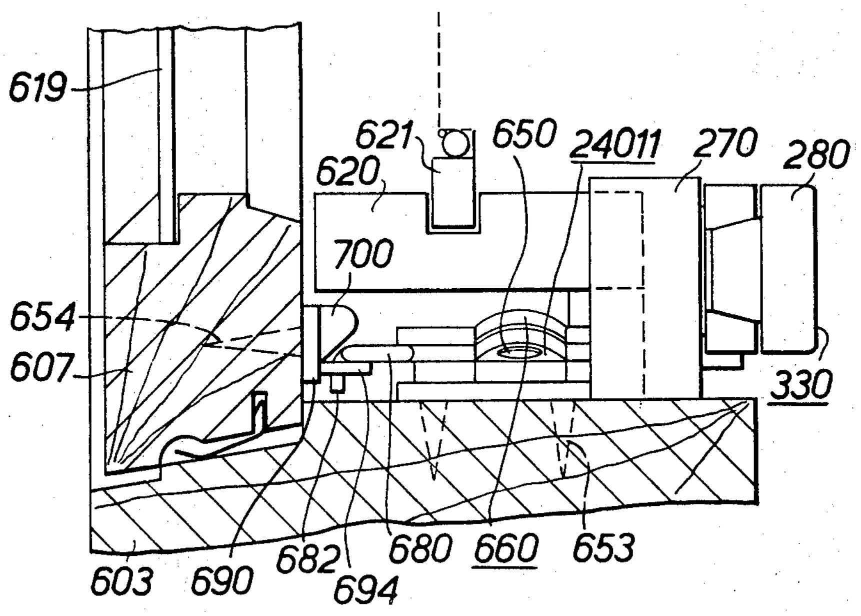
FIG. 37 is a vertical cross-section of the embodiments of FIG. 34, but in the fully-opened position.
Figure 34:
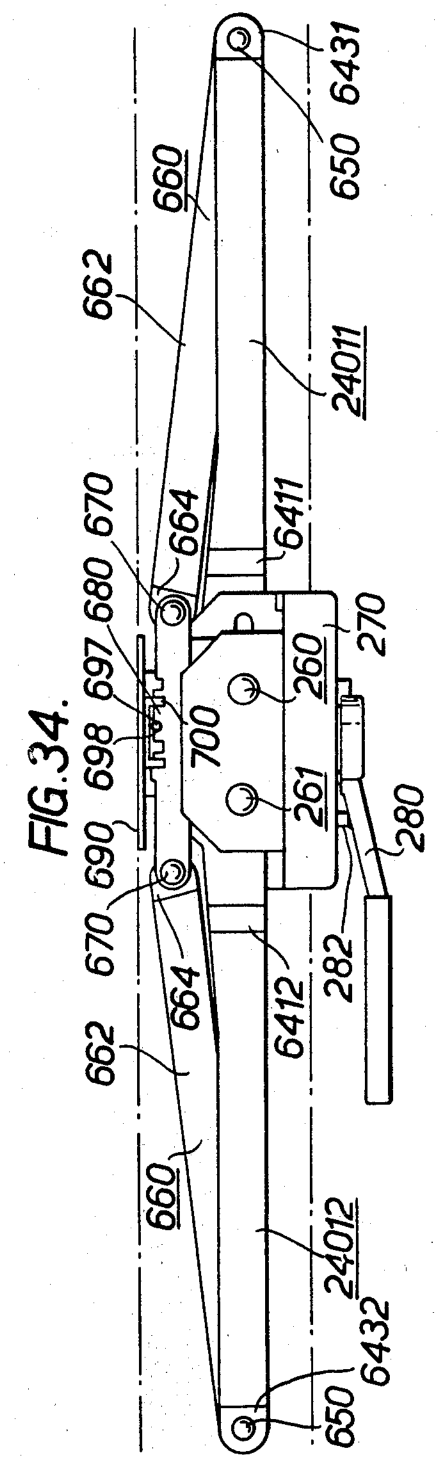
FIG. 34 is atop plan view of a window (in closed position) and showing one embodiment of a window operator of an aspect of this invention, and an embodiment of a separable interconnector of an aspect of this invention.
Figure 35:
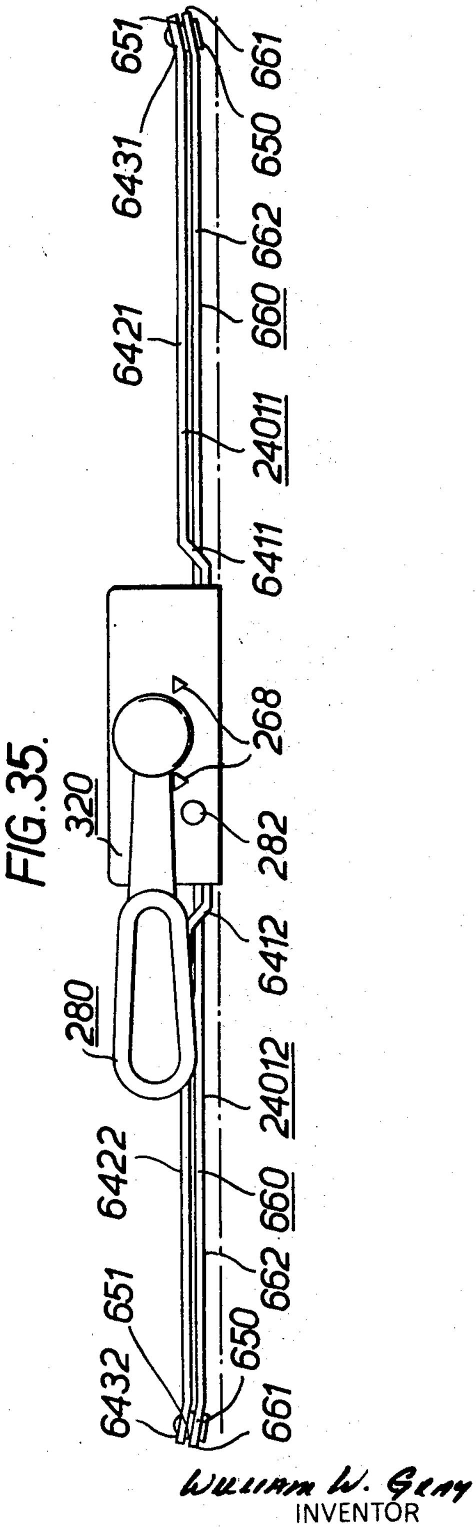
FIG. 35 is a front elevational view of the embodiments shown in FIG. 34.
Figure 36:
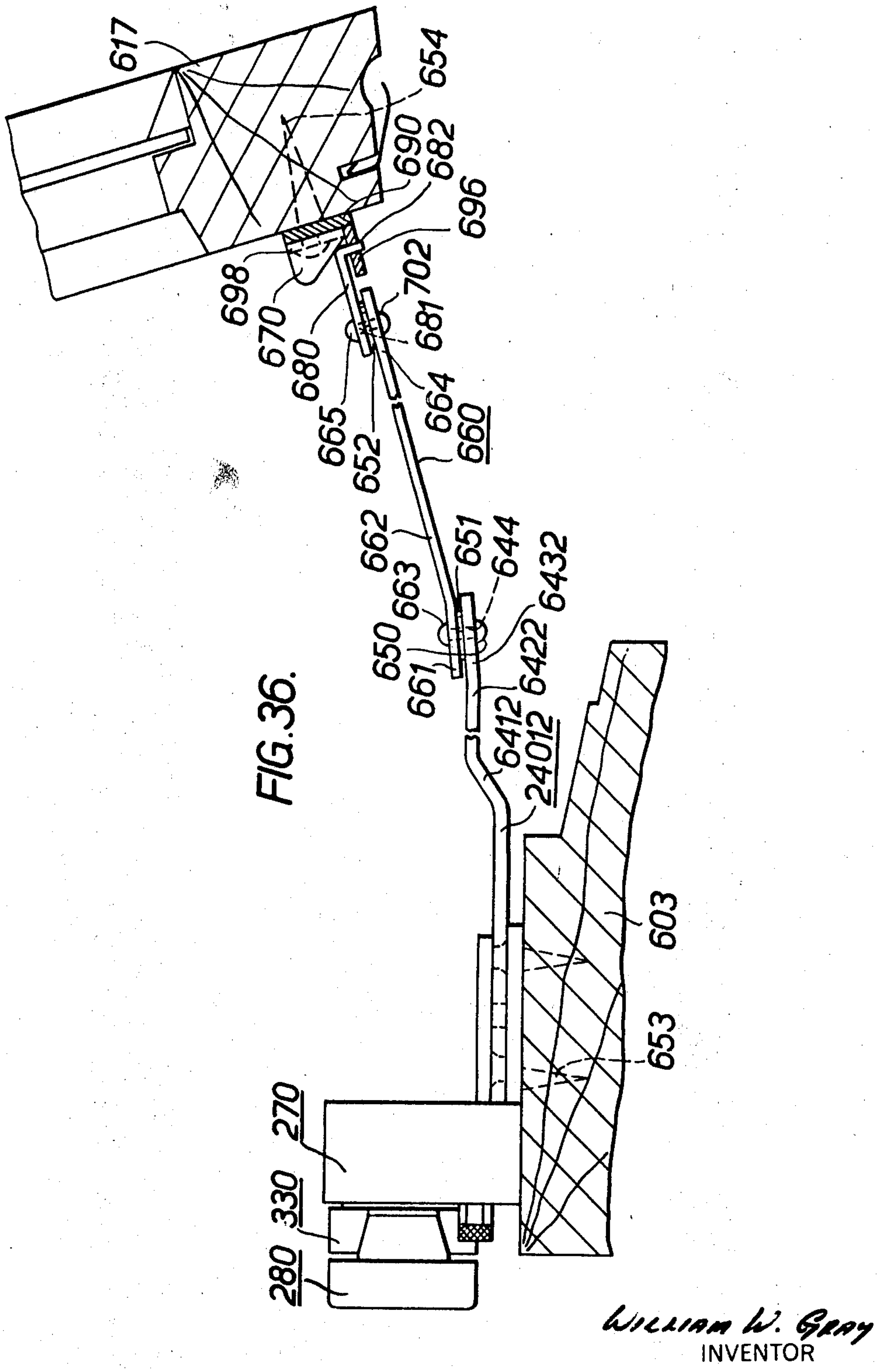
FIG. 36 is a vertical cross-section of the embodiments shown in FIG. 34.

FIGS. 36 and 37 also show the window operator 330 being secured to the lower sill 603 of the window frame 601 by means of screws 653, and that the bracket 690 is secured to the lower rail 607 of window sash 605 by means of screws 654.

In the interconnection of the window frame 601 to the window sash 605 through the use of the separable interconnector of this aspect of this invention, the components are aligned by sliding latch bar 698 so that, with the lever arms 24011, 24012 and 660 in their extended position, with tie bar 680 secured thereto, fingers 682 are lined up with slots 695. Ears 700 are moved so that they do not project over slots 695 but, in fact, are in alignment with slots 684 thereby to permit direct insertion of fingers 682 into slots 695. After fingers 682 are inserted into slots 695, lateral shift sliding of latch bar 698 places the overhanging ears 700, directly over slots 695, thereby preventing direct or accidental release. Release is thus positively controlled, is simple and foolproof, and requires only one simple moving part unlikely to be subjected to jamming.

I claim:

1. A window operator comprising:
(a) a base member;
(b) an arm, pivotally mounted on the base member for oscillation about an axis perpendicular to the plane of the base member;
(c) a handle, pivotally mounted with respect to the base member and oscillatable about an axis parallel to the plane of the base member; and
(d) means associated with the base member (A), the arm (B), and the handle (C), for translating the oscillatory motion of the handle (C) into the oscillatory motion of the arm (B).

2. A window operator comprising:
(a) a base member;
(b) an arm pivotally mounted on the base member for oscillation about an axis perpendicular to the plane of the base member;
(c) operator means on said arm adapted to be operated to oscillate said arm;
(d) link means for actuating said operator means; and
(e) a handle manually oscillatable about an axis perpendicular to the axis of rotation of said arm for operating said link means.

3. The window operator of claim 2 including two lever arms, operated by link means simultaneously to rotate said arms in opposite directions.

4. The window operator of claim 3 wherein said link means includes a plate slidable in the plane of the base member.

5. The window operator of claim 4 wherein the operator means on said arms includes a lever pin mounted on each of said arms, said lever pins being urged to follow a circumferential path by the engagement with slots in said slide.

6. The window operator of claim 5 including a glide pin mounted on a perpendicular extension of said slide member, said glide pin being guided in a longitudinally extending slot.

7. The window operator of claim 6 including a back member superposed on said lever arms, said back member including a perpendicular frontal extension thereof, said frontal extension including a slot for guiding said glide pin.

8. The window operator of claim 7 wherein said slide is caused to follow a sliding path by means of cooperation between a slot in the perpendicular extension of the slide member and a pin which is urged to follow a circumferential path.

9. The window operator of claim 8 wherein the pin which is urged to follow a circumferential path is secured to an oblate cam, which is rotationally mounted on said base member, for manual oscillation by means of a manually movable handle member.

10. The window operator of claim 2 wherein said arm (b) is pivotally mounted directly on the base member for oscillation about an axis perpendicular to the plane of the base member; wherein said operator means (c) is superposed on said arm and is adapted to be operated in order to oscillate said arm; wherein said link means (d) is mounted for cooperating with means on said operator means (c) for actuating said operator means; and wherein said handle (e) is connected to said link means and is manually oscillatable about an axis perpendicular to the axis of rotation of said arm for operating said link means.

11. The window operator of claim 10 including two lever arms, operated by said link means and said operator means in order simultaneously to rotate said arms in opposite directions.

12. The window operator of claim 11 wherein said operator means includes a plate slidable in the plane of the base member and said means on said arms includes a lever pin mounted on each of said arms, said lever pins being urged to follow a circumferential path by engagement with slots in said plate.

13. The window operator of claim 12 including a back member superposed over said plate.

14. The window operator of claim 12 wherein said plate is substantially L-shaped and is caused to follow a sliding path by means of cooperation between a slot in the vertical portion of the plate and a pin which is urged to follow a circumferential path.

15. The window operator of claim 14 wherein said link means comprises an eccentrically mounted cam, wherein said pin is secured to said cam and wherein said cam is rotationally mounted on said base member, for manual oscillation by means of said manually movable handle member.

16. A window operator comprising:
- (a) a base member including:
  - (i) a base plate, and
  - (ii) a frontal portion perpendicular to the base plate;
- (b) a pair of lever arms, each pivotally mounted on said base plate for oscillation about an axis perpendicular to the plane of the base plate;
- (c) a lever pin secured to a selected portion of each of said lever arms;
- (d) a slide comprising:
  - (1) a plate portion parallel to said base member and including:
    - (i) a longitudinally extending slot for accommodating each of said lever arm pivot mounts, and
    - (ii) a transversely extending slot for accommodating each of said lever pins, and
  - (2) an actuating portion, perpendicular to the plate portion and including:
    - (iii) a marginal slot extending towards said plate portion;
- (e) an oblate rotor, pivotally mounted on the frontal portion of said base member, said rotor including a rotor pin cooperating with the marginal slot (d) (2) (iii); and
- (f) a handle secured on said rotor bolt to said rotor, for oscillation about an axis perpendicular to the axis of rotation of said arms, for operating said lever arms.

17. The window operator of claim 16 including a cover for covering the perpendicular extensions of each of said base member and said slide, encasing said rotor but exposing said handle.

18. The window operator of claim 17 including a back superposed over said pair of lever arms, and including a perpendicularly extending portion.

19. The window operator of claim 18 in which the perpendicularly extending portion includes a longitudinally extending slot, in which a glide pin provided in the actuating portion of the slide is adapted to be guided.

20. The window operator of claim 19 including a pin provided in said handle portion, said pin being adapted to engage an aperture in the frontal portion of said base whereby to lock said window in a night latch, partially-open position.

21. The window operator of claim 16 wherein each said lever pin is rotationally mounted in a bushing which is, in turn, slidably mounted in an associated transversely extending slot in the slide, and further wherein each lever arm is pivotally mounted in the base plate by a pivot pin, rotationally mounted in a bushing which is, in turn, slidably mounted in an associated longitudinally extending slot in the slide.

22. The window operator of claim 16 wherein the rotor pin is rotationally mounted on a bushing which is slidably mounted in the marginal slot of the actuating portion of the slide.

23. The window operator of claim 21 wherein the rotor pin is rotationally mounted on a bushing which is slidably mounted in the marginal slot of the actuating portion of the slide.

24. A window operator comprising:
- (a) a generally L-shaped base member including:
  - (i) a base plate, and
  - (ii) a frontal portion perpendicular to the base plate;
- (b) a pair of lever arms, each pivotally mounted directly on said base plate for oscillation about an axis perpendicular to the plane of the base plate;
- (c) a lever pin secured to a selected portion of each of said lever arms;
- (d) operator means comprising a substantially L-shaped slide comprising:
  - (1) a plate portion parallel to said base member and superposed over said pair of lever arms, and including
    - (i) a pair of longitudinally extending slots, a selected one being adapted to accommodate a respective one of said lever arm pivot mounts, and
    - (ii) a pair of transversely extending slots, a selected one being adapted to accommodate a respective one of said lever pins, and
  - (2) an actuating portion, perpendicular to the plate portion and including:
    - (iii) a marginal slot disposed perpendicular to the plate portion and extending towards said plate portion;
- (e) a rotor, eccentrically pivotally mounted on the frontal portion of said base member, said rotor including a rotor pin cooperating with said marginal slot (d)(2)(iii); and
- (f) a handle secured to said rotor, for oscillation about an axis perpendicular to the axis of rotation of said arms, for operating said lever arms.

25. The window operator of claim 24 wherein said rotor is secured to said handle by means of rotor rivets which also mount said rotor on the frontal portion of the base member.

26. The window operator of claim 24 including a cover for covering the perpendicular extensions of each of said base member and said slide, encasing said rotor but exposing said handle.

27. The window operator of claim 26 wherein said handle is rotationally mounted by means of (iv) a first cylindrical portion rotationally mounted in an aperture in said cover; and (v) a second cylindrical portion rotationally mounted in an aperture in said frontal portion (a)(ii) of said base member.

28. The window operator of claim 27 wherein the cover and the base member are secured together.

29. The window operator of claim 28 wherein the cover and the base member are secured together by means of a connecting element or elements extending between a frontal portion of the cover and the frontal portion (a)(ii) of the base member.

30. The window operator of claim 24 including a substantially L-shaped back superposed over said slide and including a perpendicularly extending portion.

31. The window operator of claim 26 including means engageable with the rotor (e) for locking the window in a night-latch, partially open position.

32. The window operator of claim 31 wherein the engageable means comprises:

(vi) a plate slidably mounted on the upper face of the frontal portion (a)(ii) of the base member; and (vii) pin means secured to the plate and slidable in horizontally extending slots in the cover and the frontal portion (a)(ii) of the base member.

33. The window operator of claim 25 wherein each said lever pin is rotationally mounted in a bushing which is, in turn, slidably mounted in an associated transversely extending slot in the slide, and further wherein each lever arm is pivotally mounted in the base plate by a pivot pin, rotationally mounted in a bushing which is, in turn, slidably mounted in an associated longitudinally extending slot in the slide.

34. The window operator of claim 25 wherein the rotor pin is rotationally mounted on a bushing which is slidably mounted in the marginal slot of the actuating portion of the slide.

35. The window operator of claim 34 wherein the rotor pin is rotationally mounted on a bushing which is slidably mounted in the marginal slot of the actuating portion of the slide.

36. The window operator of claim 29 wherein each said lever pin is rotationally mounted in a bushing which is, in turn, slidably mounted in an associated transversely extending slot in the slide, and further wherein each lever arm is pivotally mounted in the base plate by a pivot pin, rotationally mounted in a bushing which is, in turn, slidably mounted in an associated longitudinally extending slot in the slide.

37. The window operator of claim 29 wherein the rotor pin is rotationally mounted on a bushing which is slidably mounted in the marginal slot of the actuating portion of the slide.

38. The window operator of claim 37 wherein the rotor pin is rotationally mounted on a bushing which is slidably mounted in the marginal slot of the actuating portion of the slide.

39. A mounting for separably interconnecting a sash and a window frame, said mounting comprising:

(a) a bracket adapted to be secured to said sash, said bracket including an inwardly extending ledge;

(b) a longitudinally extending slot in said ledge;

(c) a latch bar secured to the inner face of said bracket, said latch bar including an inwardly extending projection movable to overhang said longitudinally extending slot, thereby to provide restricted access to said slot;

(d) a tie bar adapted to be securely associated with said window frame, said tie bar including a downwardly projecting finger adapted to project into and to cooperate with said slot; and (e) means for selectively permitting said finger to move into, and out of, said slot.

40. The mounting of claim 39 wherein the latch bar is manually slidably secured to the bracket, and is slidable between a closed position when the projection overhangs the slot, and an access position where the projection is disposed to one side of the slot.

41. The mounting of claim 39 wherein said means (e) includes a slit disposed adjacent said finger, and extending inwardly from the leading edge of said tie bar, said slit being adapted to accommodate said projection on said latch bar.

42. The mounting of claim 40 including:

(b) a pair of longitudinally spaced apart, longitudinally extending slots in said ledge;

(c) a latch bar, secured to the inner face of said bracket, said latch bar including a pair of longitudinally spaced apart, inwardly extending projections, each said projection being slidable to overhang a selected one of said slots, thereby to provide restricted access to said slots; and (d) a tie bar adapted to be securely associated with said window frame, said tie bar including a pair of downwardly projecting, longitudinally spaced apart fingers adapted to register with, project into, and cooperate with, said slots.

43. The mounting of claim 40 including a pair of slits, one disposed adjacent a selected associated one of said fingers, and each slit extending inwardly from the leading edge of the tie bar, the slits being adapted to accommodate said projection on said latch bar.

44. The mounting of claim 43 wherein said fingers project outwardly from, and overhang, the leading edge of said tie bar.

45. The mounting of claim 44 wherein the leading edge of said slots is inwardly bevelled, preferably at an angle of about 45°.

46. A closure operator for a window having a movable sash and a frame, said operator comprising:

(a) a base adapted to be mounted on said frame;

(b) a bracket adapted for attachment to a window sash, said bracket including:

(i) an inwardly extending ledge, (ii) a longitudinally extending slot in said ledge, and (iii) a latch bar slidably secured to the inner face of said bracket, said latch bar including an inwardly extending projection slidable to overhang said longitudinally extending slot, thereby to provide restricted access to said slot;

(c) a lever arm pivotally mounted in said base for movement between a retracted position when the window is closed to an extended position when the window is fully open;

(d) a tie bar, pivotally secured to the free end of said lever arm, said tie bar including a downwardly projecting finger adapted selectively to project into, and cooperate with, said slot; and (e) means selectively permitting said finger to move into, and out of, said slot, thereby separably interconnecting said sash to said frame.

47. The closure operator of claim 46 wherein said bracket includes:

(ii) a pair of longitudinally spaced apart, longitudinally extending slots in said ledge; and (iii) a latch bar secured to the inner face of said bracket, said latch bar including a pair of longitudinally spaced apart, inwardly extending projections, each said projection being slidable to overhang a selected one of said slots, thereby to provide restricted access to said slots;

wherein said tie bar includes a pair of downwardly projecting, longitudinally spaced apart fingers adapted to register with, project into, and cooperate with, said slots, and wherein said means (e) includes a pair of slits, one disposed adjacent a selected associated one of said fingers, and each slit extending inwardly from the leading edge of the tie bar, the slits being adapted to accommodate said projection on said latch bar.

48. The closure of claim 47 wherein the leading edge of said slot or slots is inwardly bevelled, preferably at an angle of about 45°.

49. The closure of claim 47 wherein said lever arm includes:

(e) a primary lever arm pivotally mounted at one end to said base, the other end of said lever arm being upwardly bent, preferably at an angle of about 30°; and (f) a short link, one end being correspondingly upwardly bent and being pivotally secured to the upwardly bent end of said primary lever arm, the other end of said short link being pivotally secured to said tie bar.

50. A closure operator for an awning-type window having a movable sash and a frame, said operator comprising:

(I) operating mechanism on said frame;

(II) a pair of arms movable by said operating mechanism; and (III) motion-translating mechanism associated with said arms and said sash, said motion-translating mechanism including (a) a bracket adapted for attachment to a window sash, said bracket including (i) an inwardly extending ledge;

(ii) a longitudinally extending slot in said ledge, and (iii) a latch bar slidably secured to the inner face of said bracket, said latch bar including an inwardly extending projection slidable to overhang said longitudinally extending slot, thereby to provide restricted access to said slot;

(b) a tie bar, adapted to be pivotally secured to a respective free end of each of said pair of arms, said tie bar including a downwardly projecting finger adapted selectively to project into, and cooperate with, said slot; and (c) means selectively permitting said finger to move into, and out of, said slot, thereby separably interconnecting said sash to said frame.

51. The closure of claim 50 wherein said bracket includes:

(ii) a pair of longitudinally spaced apart, longitudinally extending slots in said ledge; and (iii) a latch bar slidably secured to the inner face of said bracket, said latch bar including a pair of longitudinally spaced apart, inwardly extending projections, each said projection being slidable to overhang a selected one of said slots, thereby to provide restricted access to said slots;

wherein said tie bar includes a pair of downwardly projecting, longitudinally spaced apart fingers adapted to register with, project into, and cooperate with, said slots, and wherein said means (e) includes a pair of slits, one disposed adjacent a selected associated one of said fingers, and each slit extending inwardly from the leading edge of the tie bar, the slits being adapted to accommodate said projection on said latch bar.

52. The closure of claim 51 wherein the leading edge of said slot or slots is inwardly bevelled, preferably at an angle of about 45°.

53. The closure of claim 50 wherein each said arm includes:

(e) a primary lever arm pivotally mounted at one end to said base, the other end of said lever arm being upwardly bent, preferably at an angle of about 30°; and (f) a short link, one end being correspondingly upwardly bent and being pivotally secured to the upwardly bent end of said primary lever arm, the other end of said short link being pivotally secured to said tie bar.

54. The closure operator of claim 53 wherein said arms are operated by rotation of a lever on said operating mechanism through an angle of about 180° in a plane parallel to the plane of the awning-type window when it is in a closed position.

References Cited

UNITED STATES PATENTS

| | | | |
|---|---|---|---|
| 2,950,509 | 8/1960 | Starenau | 49—324 X |
| 3,214,157 | 10/1965 | Starenau | 49—324 |
| 3,438,151 | 4/1969 | Evers et al. | 49—324 X |

J. KARL BELL, Primary Examiner

U.S. Cl. X.R.

49—339, 345; 74—96